US012803353B2

(12) United States Patent
Watanabe et al.

(10) Patent No.: US 12,803,353 B2
(45) Date of Patent: Nov. 17, 2026

(54) MOTOR, BLOWER, AND AIR CONDITIONER

(71) Applicant: Mitsubishi Electric Corporation, Tokyo (JP)

(72) Inventors: Takanori Watanabe, Tokyo (JP); Kazuchika Tsuchida, Tokyo (JP); Takaya Shimokawa, Tokyo (JP); Ryogo Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 18/846,863

(22) PCT Filed: Apr. 5, 2022

(86) PCT No.: PCT/JP2022/017114

§ 371 (c)(1),
(2) Date: Sep. 13, 2024

(87) PCT Pub. No.: WO2023/195076

PCT Pub. Date: Oct. 12, 2023

(65) Prior Publication Data

US 2025/0211043 A1 Jun. 26, 2025

(51) Int. Cl.

*H02K 1/278* (2022.01)
*H02K 1/02* (2006.01)

(Continued)

(52) U.S. Cl.

CPC ............... *H02K 1/278* (2013.01); *H02K 1/02* (2013.01); *H02K 1/30* (2013.01); *H02K 15/035* (2025.01); *H02K 21/16* (2013.01)

(58) Field of Classification Search

CPC ........ H02K 1/278; H02K 15/035; H02K 1/02; H02K 21/16

(Continued)

(56) References Cited

U.S. PATENT DOCUMENTS

2020/0067358 A1 2/2020 Takahashi et al.
2022/0045589 A1 2/2022 Watanabe et al.

FOREIGN PATENT DOCUMENTS

JP 2005-151757 A 6/2005
JP 2007-208104 A 8/2007

(Continued)

OTHER PUBLICATIONS

Office Action dated Mar. 18, 2025 issued in corresponding Japanese Patent Application No. 2024-513596 (and English machine translation).

(Continued)

*Primary Examiner* — Jose A Gonzalez Quinones
(74) *Attorney, Agent, or Firm* — Posz Law Group, PLC

(57) ABSTRACT

A motor includes a rotor having a shaft and a rotor magnet, and a stator. The rotor magnet includes a first magnet magnetized so as to have polar-anisotropic orientation, and second magnets, the number of which is P (P is an even number), provided on an outer circumference of the first magnet, magnetized so as to have polar-anisotropic orientation, and having a stronger magnetic pole than the first magnet. A length Hr of the rotor magnet in the axial direction and a length Hs of a stator core in the axial direction satisfy Hr>Hs. The rotor magnet includes, in the axial direction, a stator-facing portion facing the stator core in the radial direction and an overhang portion protruding from the stator core in the axial direction. A volume ratio of the second magnets to the first magnet is smaller in the overhang portion than in the stator-facing portion.

11 Claims, 19 Drawing Sheets

(51) Int. Cl.

| | |
|---|---|
| ***H02K 1/30*** | (2006.01) |
| ***H02K 15/035*** | (2025.01) |
| ***H02K 21/16*** | (2006.01) |

(58) Field of Classification Search
USPC .................................................... 310/156.55
See application file for complete search history.

(56) References Cited

FOREIGN PATENT DOCUMENTS

| | | | | | |
|---|---|---|---|---|---|
| JP | 2011-87393 | A | | 4/2011 | |
| JP | 2016-219607 | A | | 12/2016 | |
| WO | 2018/134988 | A1 | | 7/2018 | |
| WO | 2020/129123 | A1 | | 6/2020 | |
| WO | WO-2021192236 | A1 | * | 9/2021 | ............ H02K 15/03 |

OTHER PUBLICATIONS

International Search Report of the International Searching Authority dated Jun. 21, 2022 for the corresponding International Application No. PCT/JP2022/017114 (and English translation).

* cited by examiner

MOTOR, BLOWER, AND AIR CONDITIONER

CROSS-REFERENCE TO RELATED APPLICATION

This application is a U.S. national stage application of PCT/JP2022/017114 filed Apr. 5, 2022, the contents of which are incorporated herein by reference.

TECHNICAL FIELD

The present disclosure relates to a motor, a blower, and an air conditioner.

BACKGROUND

There is a known rotor of a motor including two types of permanent magnets having different magnetic properties. For example, a rotor described in Patent Reference 1 includes an annular ferrite bonded magnet, and an annular rare-earth bonded magnet provided on the outer periphery of the ferrite bonded magnet.

PATENT REFERENCE

Patent Reference 1: Japanese Patent Application Publication No. 2005-151757 (see FIG. 1)

In the above-described rotor, a magnetic force is enhanced since the ferrite bonded magnet is combined with the rare-earth bonded magnet. However, the rare-earth bonded magnet is more expensive than the ferrite bonded magnet, and thus it is difficult to reduce the manufacturing cost of the rotor with the annular rare-earth bonded magnet.

SUMMARY

It is therefore an object of the present disclosure to reduce the manufacturing cost of a motor.

A motor according to the present disclosure includes a rotor having a shaft and a rotor magnet fixed with respect to the shaft, and a stator surrounding the rotor in a radial direction about the shaft. The rotor magnet includes a first magnet magnetized so as to have polar-anisotropic orientation, and second magnets, the number of which is P (P is an even number), provided on an outer circumference of the first magnet, magnetized so as to have polar-anisotropic orientation, and having a stronger magnetic pole than the first magnet. The stator includes a stator core and a coil wound on the stator core. A length Hr of the rotor magnet in an axial direction of the shaft and a length Hs of the stator core in the axial direction satisfy Hr>Hs. The rotor magnet includes, in the axial direction, a stator-facing portion facing the stator core in the radial direction and an overhang portion protruding from the stator core in the axial direction. The first magnet has grooves, the number of which is P, arranged at equal intervals on the outer circumference at the stator-facing portion. The second magnets are respectively disposed in the grooves. A volume ratio of the second magnets to the first magnet is smaller in the overhang portion than in the stator-facing portion.

According to the present disclosure, the volume ratio of the second magnets to the first magnet is smaller in the overhang portion than in the stator-facing portion, and thus the manufacturing cost can be reduced without decrease in output and efficiency of the motor.

DETAILED DESCRIPTION

First Embodiment

Configuration of Motor 100

Figure 1A:
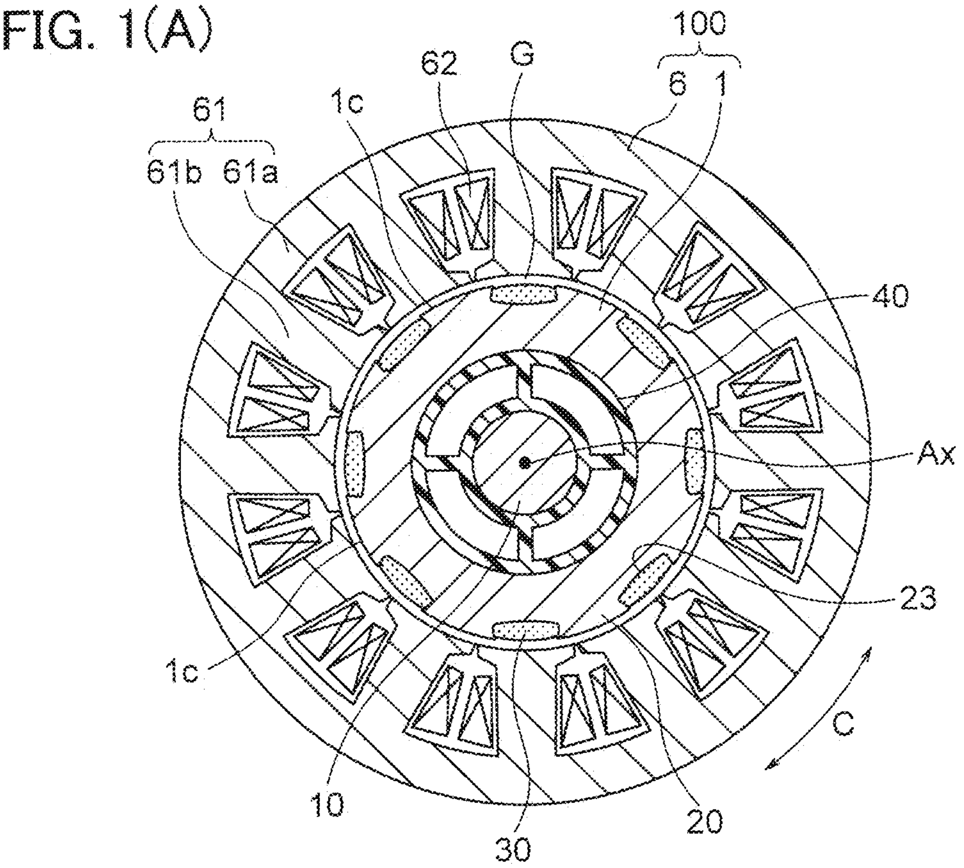
FIG. 1(A) and FIG. 1(B) are respectively a sectional view and a partial sectional view illustrating a main part of a motor according to a first embodiment.
Figure 1B:
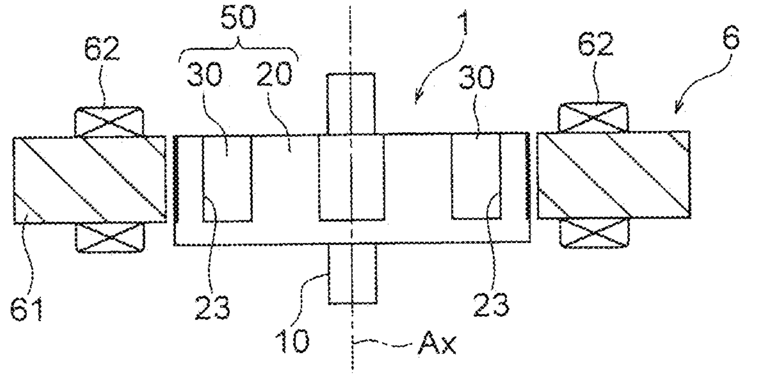
Figure 2:
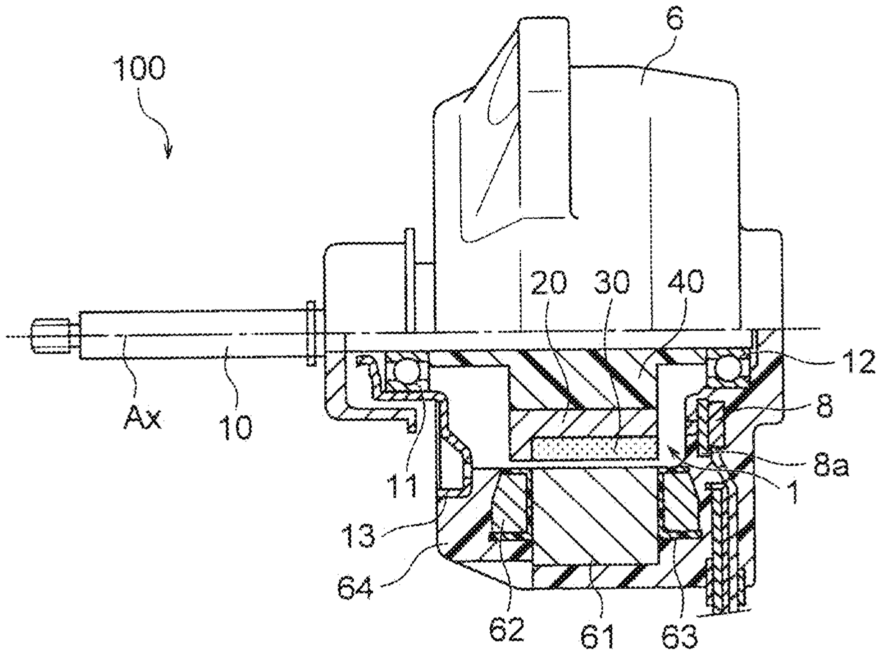
FIG. 2 is a partial sectional view illustrating the motor according to the first embodiment.

FIG. 1(A) is a sectional view illustrating a main part of a motor 100 according to a first embodiment. FIG. 1(B) is a partial sectional view illustrating the main part of the motor 100. FIG. 2 is a partial sectional view illustrating the entire motor 100. The motor 100 is, for example, a permanent magnet synchronous motor.

As illustrated in FIGS. 1(A) and 1(B), the motor 100 includes a rotor 1 and a stator 6. The rotor 1 is disposed inside the stator 6. That is, the motor 100 is an inner rotor type motor. An air gap G is formed between the rotor 1 and the stator 6. The air gap G is, for example, a gap of 0.5 mm. Of the rotor 1 and the stator 6, the stator 6 is illustrated in a section in FIG. 1(B).

The rotor 1 includes a shaft 10 as a rotating shaft. The center axis of the shaft 10 defining the rotation center of the rotor 1 will be referred to as a center axis Ax. A direction of the center axis Ax will be referred to as an "axial direction." A direction along a circumference of a circle about the center axis Ax will be referred to as a "circumferential direction," and a radial direction of the circle about the center axis Ax will be referred to as a "radial direction."

The stator 6 includes a stator core 61, a coil 62, an insulator 63 (FIG. 2), and a molding resin part 64 (FIG. 2).

The stator core 61 includes a yoke **61*a* which is annular about the center axis Ax, and a plurality of teeth 61*b* extending inward in the radial direction from the yoke 61*a*. The teeth 61*b* are arranged at equal angles in the circumferential direction. Each tooth 61*b* faces an outer circumference 1*c* of the rotor 1 via the air gap G. The number of the teeth 61*b* is 12 in the example illustrated in FIG. 1(A). In this regard, the number of the teeth 61*b*** is not limited to 12, and may be any number greater than or equal to two.

The coil 62 is wound on the teeth **61*b* of the stator core 61. The coil 62 is made of a copper wire or an aluminum wire. The insulator 63 illustrated in FIG. 2 is made of a resin, and electrically insulates the stator core 61 and the coil 62** from each other.

The molding resin part 64 covers the stator core 61, the coil 62, and the insulator 63. The rotor 1 is housed inside the molding resin part 64, and the shaft 10 projects to one side (to the left in the figure) in the axial direction. Of bearings 11 and 12 supporting the shaft 10, the bearing 11 is held by a bracket 13 attached to the one side (left side in the figure) of the molding resin part 64, and the bearing 12 is held on the other side of the molding resin part 64.

The motor 100 is not limited to the structure in which the stator core 61 and the like are covered with the molding resin part 64, and may have a structure in which the stator core 61 is fitted into a cylindrical frame.

In the example illustrated in FIG. 2, the motor 100 further includes a circuit board 8 on which a magnetic sensor **8*a* is mounted. The magnetic sensor 8*a* detects a magnetic field of a sensor magnet (not shown) provided on the rotor 1 to thereby detect the position of the rotor 1 in the circumferential direction. In this regard, the motor 100 can also be implemented without the magnetic sensor 8*a***.

Configuration of Rotor 1

Figure 3A:
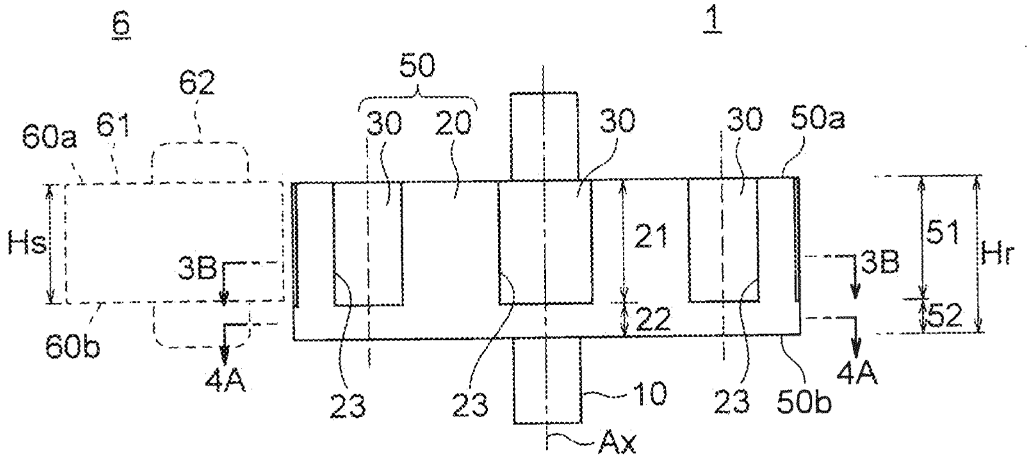
FIG. 3(A) is a side view illustrating a rotor according to the first embodiment.

Next, a configuration of the rotor 1 will be described. FIG. 3(A) is a side view illustrating the rotor 1 shown in FIG. 1. In FIG. 3(A), a part of the stator 6 is indicated by broken lines. The rotor 1 includes P magnetic poles. P is an even number of two or more, and is eight in this example.

The rotor 1 includes a shaft 10 and a rotor magnet 50 fixed with respect to the shaft 10. The rotor magnet 50 includes a ferrite bonded magnet 20 and a plurality of rare-earth bonded magnets 30. The number of the rare-earth bonded magnets 30 is equal to the number P of poles of the rotor 1. The ferrite bonded magnet 20 will also be referred to as a first magnet or a first resin magnet. The rare-earth bonded magnet 30 will also be referred to as a second magnet or a second resin magnet.

When the length of the rotor magnet 50 in the axial direction is expressed as Hr and the length of the stator core 61 in the axial direction is expressed as Hs, the length Hr is longer than the length Hs (Hr>Hs).

The rotor magnet 50 projects from the stator core 61 to one side in the axial direction, for example, downward in FIG. 3(A). The rotor magnet 50 has a first end surface **50*a* that is one end surface in the axial direction and a second end surface 50*b*** that is the other end surface in the axial direction.

The first end surface **50*a* of the rotor magnet 50 is located at the same position in the axial direction as a first end surface 60*a* that is one end surface of the stator core 61 in the axial direction. On the other hand, the second end surface 50*b* of the rotor magnet 50 is located below a second end surface 60*b*, which is the other end surface of the stator core 61 in the axial direction, in the figure. That is, the second end surface 50*b* is located on a side with respect to the second end surface 60*b* away from the first end surface 50*a***.

Accordingly, the rotor magnet 50 includes a stator-facing portion 51 and an overhang portion 52 in the axial direction. The stator-facing portion 51 faces the stator core 61 via the air gap. The overhang portion 52 protrudes from the stator core 61 in the axial direction.

Figure 3B:
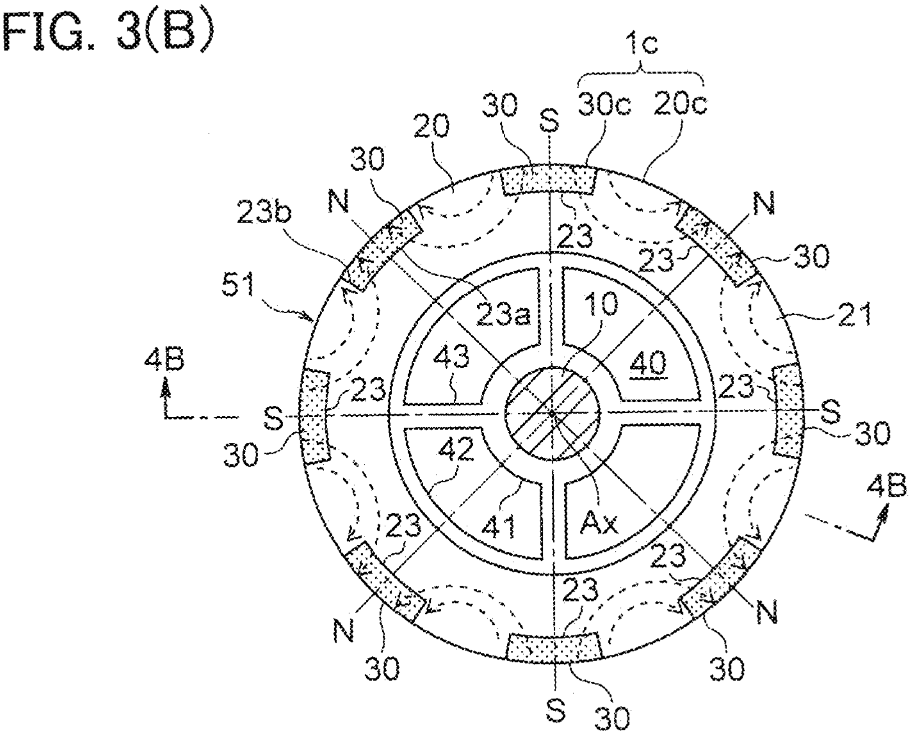
FIG. 3(B) is a sectional view taken along line 3B-3B shown in FIG. 3(A).

FIG. 3(B) is a sectional view taken along line 3B-3B shown in FIG. 3(A), that is, a sectional view of the rotor 1 in a plane passing through the stator-facing portion 51. As illustrated in FIG. 3(B), the ferrite bonded magnet 20 is supported by the shaft 10 via a resin portion 40 serving as a holding portion. The resin portion 40 is formed of, for example, a thermoplastic resin such as polybutylene terephthalate (PBT). The resin portion 40 includes an inner cylinder portion 41, an outer cylinder portion 42, and a plurality of ribs 43. The number of the ribs 43 is, for example, four, but is not limited to four.

The inner cylinder portion 41 is cylindrical and fixed to the outer circumference of the shaft 10. The outer cylinder portion 42 is cylindrical and fixed to the inner circumference of the annular ferrite bonded magnet 20. The ribs 43 couple the inner cylinder portion 41 and the outer cylinder portion 42 to each other. The ribs 43 radially extend outward in the radial direction from the outer circumference of the inner cylinder portion 41. In this regard, it is also possible to fix the ferrite bonded magnet 20 directly to the shaft 10 without providing the resin portion 40.

Configuration of Ferrite Bonded Magnet 20

The ferrite bonded magnet 20 includes a ferrite magnet and a resin. The resin included in the ferrite bonded magnet 20 is, for example, at least one of nylon, polyphenylene sulfide (PPS), and an epoxy resin.

A portion of the ferrite bonded magnet 20 included in the stator-facing portion 51 will be referred to as a first portion 21, and a portion of the ferrite bonded magnet 20 included in the overhang portion 52 will be referred to as a second portion 22.

As illustrated in FIG. 3(B), the ferrite bonded magnet 20 has an annular shape about the center axis Ax. An outer circumference 20*c* of the ferrite bonded magnet 20 forms a portion of the outer circumference 1*c* of the rotor 1.

The ferrite bonded magnet 20 is magnetized so as to have polar-anisotropic orientation. Accordingly, north poles and south poles are alternately formed on the outer circumference 20*c* of the ferrite bonded magnet 20.

The first portion 21 of the ferrite bonded magnet 20 includes a plurality of grooves 23 on the outer circumference 20*c*. The grooves 23 are arranged at equal intervals in the circumferential direction. The grooves 23 are located at positions corresponding to north poles and positions corresponding to north poles. The number of the grooves 23 is equal to the number P of poles of the rotor 1. The rare-earth bonded magnets 30 are disposed in the grooves 23.

Each of the grooves 23 has a bottom surface 23*a* and side surfaces 23*b*. The bottom surface 23*a* is a surface of the groove 23 facing outward in the radial direction. The side surfaces 23*b* extend outward in the radial direction from both ends of the bottom surface 23*a* in the width direction. The side surface 23*b* is a boundary between the ferrite bonded magnet 20 and the rare-earth bonded magnet 30.

In the ferrite bonded magnet 20, magnetic fluxes flowing from the grooves 23 of the south poles travel to the adjacent grooves 23 of the north poles, as indicated by broken lines in FIG. 3(B). Thus, a rotor core constituting a magnetic path does not need to be provided on the inner side of the ferrite bonded magnet 20 in the radial direction. Accordingly, the number of parts in the rotor 1 can be reduced, and the weight of the rotor 1 can be reduced.

In the ferrite bonded magnet 20, a portion between the groove 23 of the north pole and its adjacent groove 23 of the south pole constitutes an inter-pole portion of the rotor 1.

Configuration of Rare-Earth Bonded Magnets 30

Each of the rare-earth bonded magnets 30 includes a rare-earth magnet and a resin. Examples of the rare earth magnet include a neodymium magnet containing neodymium (Nd), iron (Fe), and boron (B), and a samarium-iron-nitrogen magnet containing samarium (Sm), Fe, and nitrogen (N), and the like. The resin included in the rare-earth bonded magnets 30 is the same as the resin included in the ferrite bonded magnet 20, for example. That is, the resin included in the rare-earth bonded magnets 30 is at least one of nylon, PPS, and an epoxy resin, for example.

The strength of magnetic poles (i.e., magnetic quantity) of the rare-earth bonded magnets 30 is greater than the strength of the magnetic pole of the ferrite bonded magnet 20. In other words, a magnetic force of the rare-earth bonded magnets 30 is greater than a magnetic force of the ferrite bonded magnet 20. That is, the rare-earth bonded magnets 30 are made of a material different from the ferrite bonded magnet 20, and have magnetic properties different from those of the ferrite bonded magnet 20.

The rare-earth bonded magnets 30 are arranged at equal intervals in the circumferential direction. More specifically, the rare-earth bonded magnets 30 are disposed in the grooves 23 of the ferrite bonded magnet 20. In the first embodiment, the rare-earth bonded magnets 30 are bonded to the grooves 23 of the ferrite bonded magnet 20 by integral molding (also referred to as "double molding") of the ferrite bonded magnet 20 and the rare-earth bonded magnets 30.

The rare-earth bonded magnets 30 are magnetized so as to have polar-anisotropic orientation. Each two of the rare-earth bonded magnets 30 adjacent to each other in the circumferential direction have magnetic poles of different polarities. Outer circumferences 30*c* of the rare-earth bonded magnets 30 form parts of the outer circumference 1*c* of the rotor 1 (see FIG. 3(B)). Each of the rare-earth bonded magnets 30 constitutes a magnetic pole center of the corresponding magnetic pole.

The ferrite bonded magnet 20 and the rare-earth bonded magnets 30 are integrally molded by filling the grooves 23 with a material for the rare-earth bonded magnets 30 in a state where the previously produced ferrite bonded magnet 20 is disposed in a mold. As compared to a manufacturing process in which the ferrite bonded magnet 20 is molded with the previously produced rare-earth bonded magnets 30 disposed in a mold, the work of disposing the rare-earth bonded magnets 30 in the mold one by one can be eliminated, and thus, the manufacturing process of the rotor 1 can be simplified.

Each of the rare-earth bonded magnets 30 has an outer circumferential surface facing outward in the radial direction and an inner circumferential surface facing inward in the radial direction. In the example illustrated in FIG. 3(B), both the outer circumferential surface and the inner circumferential surface of the rare-earth bonded magnet 30 have arc shapes about the center axis Ax, but do not necessarily have arc shapes. In sectional views of the rotor orthogonal to the center axis Ax such as FIG. 3(B), hatchings of the ferrite bonded magnet 20 and the resin portion 40 are omitted.

Figure 4A:
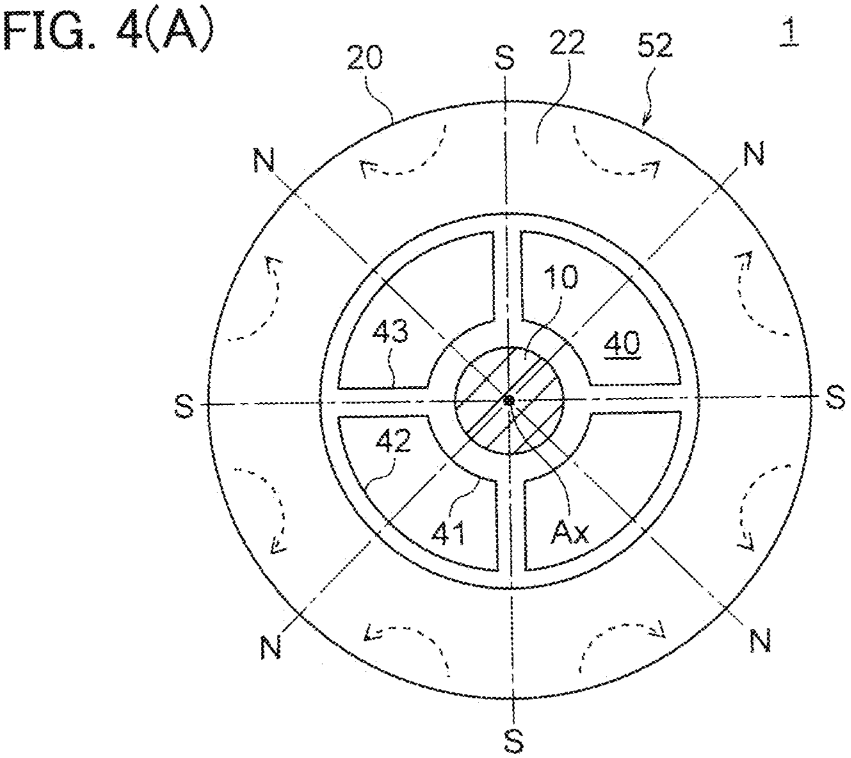
FIG. 4(A) is a sectional view taken along line 4A-4A shown in FIG. 3(A).

FIG. 4(A) is a sectional view taken along line 4A-4A shown in FIG. 3(A), that is, a sectional view of the rotor 1 in a plane passing through the overhang portion 52. As illustrated in FIG. 4(A), the overhang portion 52 of the rotor magnet 50 does not include the rare-earth bonded magnets 30, and is constituted only by the annular ferrite bonded magnet 20.

The outer diameter of the overhang portion 52 of the rotor magnet 50 is equal to the outer diameter of the stator-facing portion 51. Thus, the outer circumference of the second portion 22 of the ferrite bonded magnet 20 is located on the same cylindrical surface as the outer circumference of the first portion 21, and forms a portion of the outer circumference 20*c* described above.

The ferrite bonded magnet 20 is magnetized as described with reference to FIG. 3(B). Thus, in the overhang portion 52, the north poles and the south poles are alternately formed in the circumferential direction on the outer circumference of the ferrite bonded magnet 20. In the overhang portion 52, no grooves 23 are formed on the outer circumference of the ferrite bonded magnet 20.

Figure 4B:
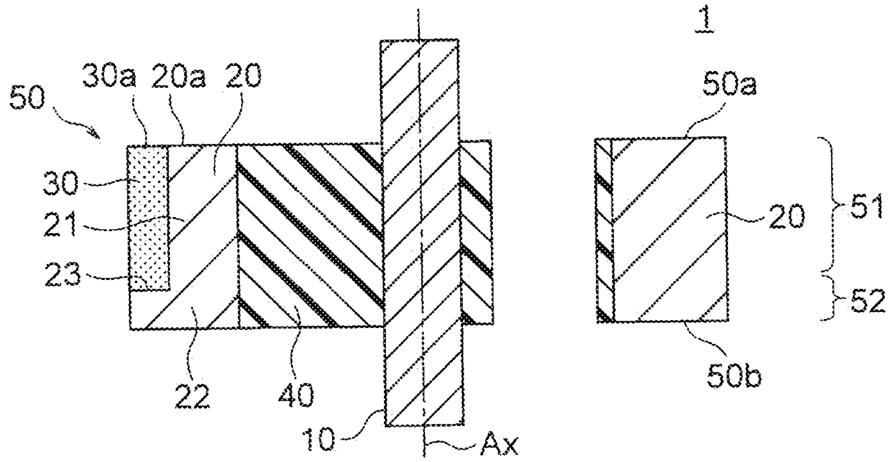
FIG. 4(B) is a sectional view taken along line 4B-4B shown in FIG. 3(B)

FIG. 4(B) is a sectional view taken along line 4B-4B in FIG. 3(B). As illustrated in FIG. 4(B), the grooves 23 of the ferrite bonded magnet 20 are formed in the first portion 21 and are not formed in the second portion 22. Thus, the stator-facing portion 51 of the rotor magnet 50 includes the rare-earth bonded magnets 30, and the overhang portion 52 does not include the rare-earth bonded magnets 30.

The ferrite bonded magnet 20 has an end surface 20*a* constituting a portion of the first end surface 50*a* of the rotor magnet 50. The grooves 23 are open at the end surface 20*a*. Thus, the rare-earth bonded magnets 30 have end surfaces 30*a* constituting a portion of the first end surface 50*a* of the rotor magnet 50.

Functions

Figure 5A:
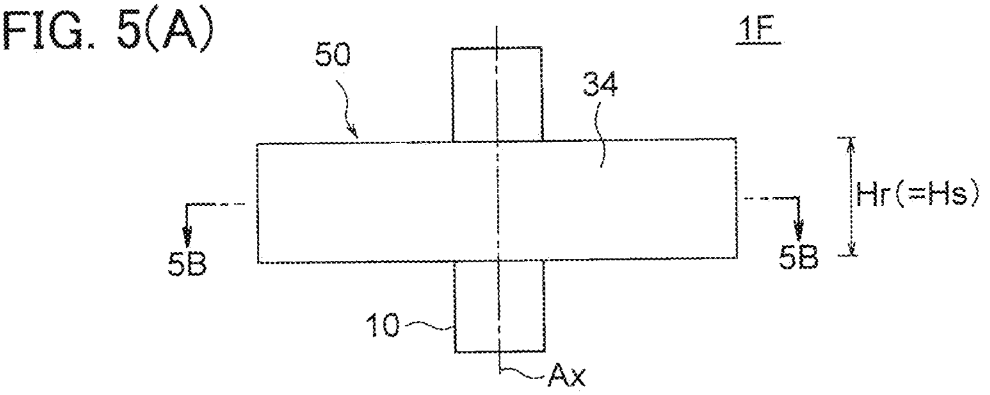
FIG. 5(A) is a side view illustrating a rotor of a first comparative example.
Figure 5B:
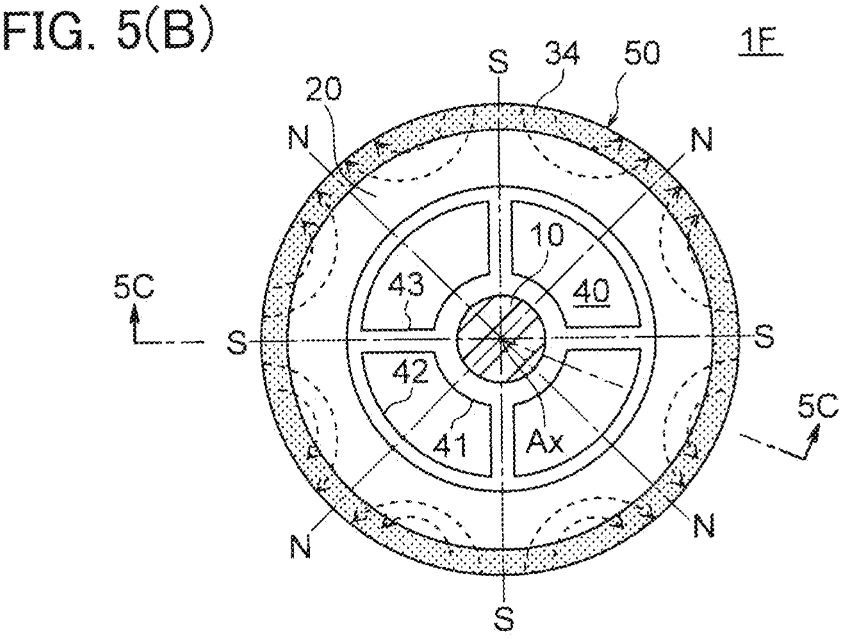
FIG. 5(B) is a sectional view taken along line 5B-5B shown in FIG. 5(A).
Figure 5C:
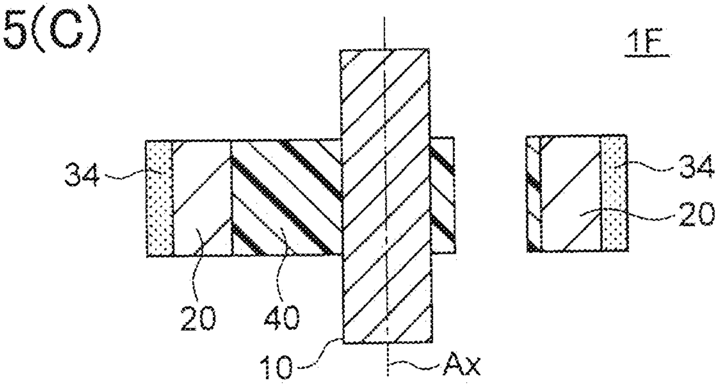
FIG. 5(C) is a sectional view taken along line 5C-5C shown in FIG. 5(B).

Next, functions of the first embodiment will be described in comparison with first and second comparative examples. FIG. 5(A) is a side view illustrating a rotor 1F of the first comparative example. FIG. 5(B) is a sectional view taken along line 5B-5B in FIG. 5(A). FIG. 5(C) is a sectional view taken along line 5C-5C in FIG. 5(B).

The rotor 1F of the first comparative example includes a shaft 10 and a rotor magnet 50 fixed with respect to the shaft 10. The rotor magnet 50 includes a ferrite bonded magnet 20 and an annular rare-earth bonded magnet 34 covering the outer circumference of the ferrite bonded magnet 20. A length Hr of the rotor magnet 50 in the axial direction is equal to the length Hs of the stator core 61 (FIG. 1(B)) in the axial direction. The rare-earth bonded magnets 30 are formed over the entire region of the rotor magnet 50 in the axial direction.

In the rotor 1F of the first comparative example, the rare-earth bonded magnet 34 is formed in an annular shape to cover the outer circumference of the ferrite bonded magnet 20. Thus, magnetic flux density distribution on the surface of the rotor magnet 50 can be made close to a sine wave.

However, the rare-earth bonded magnet 34 has the annular shape and has a thickness necessary for obtaining sufficient strength in the radial direction, and thus the amount of use of the rare-earth bonded magnets 30 is large. A unit price of a material for the rare-earth bonded magnet 30 is greater than or equal to 10 times a unit price of a material for the ferrite bonded magnet 20. Thus, as the amount of use of the rare-earth bonded magnets 30 increases, the manufacturing cost of the rotor 1F increases.

Figure 6A:
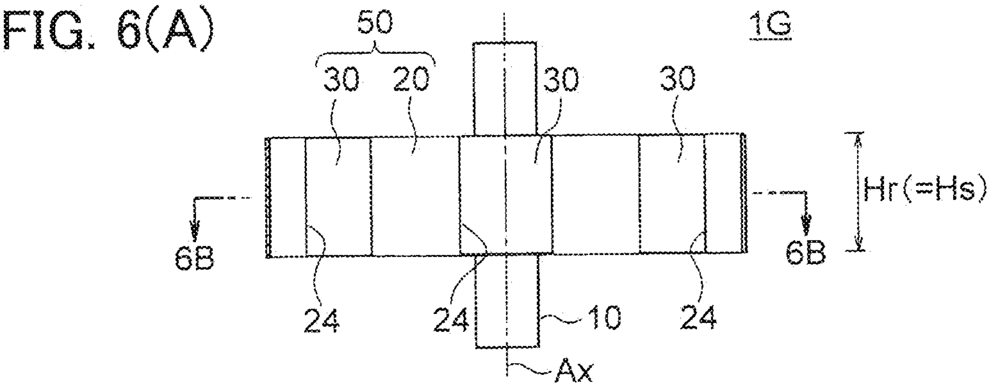
FIG. 6(A) is a side view illustrating a rotor of a second comparative example.
Figure 6B:
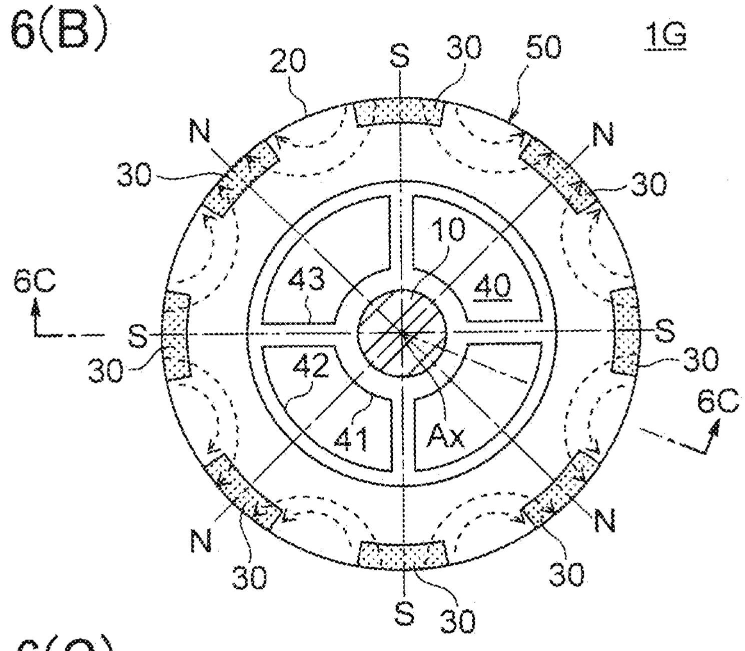
FIG. 6(B) is a sectional view taken along line 6B-6B shown in FIG. 6(A).
Figure 6C:
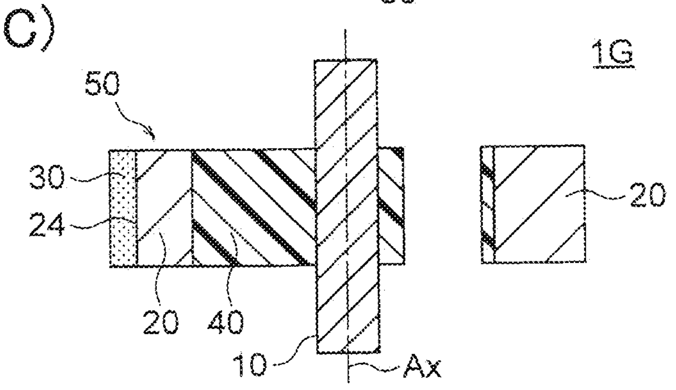
FIG. 6(C) is a sectional view taken along line 6C-6C shown in FIG. 6(B).

FIG. 6(A) is a side view illustrating a rotor 1G of the second comparative example. FIG. 6(B) is a sectional view taken along line 6B-6B shown in FIG. 6(A). FIG. 6(C) is a sectional view taken along line 6C-6C shown in FIG. 6(B).

The rotor 1G of the second comparative example includes a shaft 10 and a rotor magnet 50 fixed with respect to the shaft 10. The rotor magnet 50 includes a ferrite bonded magnet 20 and a plurality of rare-earth bonded magnets 30 arranged on the outer circumference of the ferrite bonded magnet 20. A length Hr of the rotor magnet 50 in the axial direction is equal to a length Hs of the stator core 61 (FIG. 1(B)) in the axial direction. The rare-earth bonded magnets 30 are formed over the entire region of the rotor magnet 50 in the axial direction.

In the rotor 1G of the second comparative example, the rare-earth bonded magnets 30 are distributed in the circumferential direction. Accordingly, as compared to the rotor 1F of the first comparative example, the amount of use of the rare-earth bonded magnets 30 can be reduced by, for example, 208, and thus the manufacturing cost of the rotor 1G can be reduced.

Although the magnetic force of the ferrite bonded magnet 20 is smaller than that of the rare-earth bonded magnets 30, the rotor magnet 50 has polar-anisotropic orientation, and the rare-earth bonded magnets 30 are arranged at magnetic pole centers. Thus, it is possible to suppress a decrease of the surface magnetic flux density due to the small amount of use of the rare-earth bonded magnets 30.

However, in the rotor 1G of the second comparative example, since the length Hr of the rotor magnet 50 in the axial direction is equal to the length Hs of the stator core 61 in the axial direction, magnetic fluxes flowing into the stator core 61 are only magnetic fluxes flowing from the ferrite bonded magnet 20 and the rare-earth bonded magnets 30 into the inner circumferential surface of the stator core 61. Thus, it is difficult to increase the magnetic fluxes flowing into the stator core 61. When the length Hr of the rotor magnet 50 in the axial direction is increased, the amount of use of the rare-earth bonded magnets 30 increases accordingly, and the manufacturing cost increases.

On the other hand, in the rotor 1 of the first embodiment, in a manner similar to the rotor 1G of the second comparative example, the rare-earth bonded magnets 30 are distributed in the circumferential direction (see FIG. 3(B)). Thus, the amount of use of the rare-earth bonded magnets 30 can be reduced, so that the manufacturing cost can be reduced. In addition, since the rare-earth bonded magnets 30 are located at the magnetic pole centers, a decrease in surface magnetic flux density can be suppressed.

Further, in the rotor 1 of the first embodiment, since the rotor magnet 50 includes the stator-facing portion 51 and the overhang portion 52 (see FIG. 3(A)), magnetic fluxes flow from the stator-facing portion 51 into the inner circumferential surface of the stator core 61, and magnetic fluxes flow from the overhang portion 52 into the end surface of the stator core 61 in the axial direction. Thus, magnetic fluxes flowing into the stator core 61 can be increased, as compared to the second comparative example.

In this example, most part of magnetic fluxes flowing from the overhang portion 52 flows into the end surface of the stator core 61 in the axial direction, but a part of magnetic fluxes becomes leakage fluxes that do not flow into the stator core 61. Thus, the overhang portion 52 is constituted by the ferrite bonded magnet 20 with a low magnetic force, so that magnetic fluxes flowing into the stator core 61 can be increased while reducing the manufacturing cost.

Manufacturing Method of Rotor 1

Figure 7:
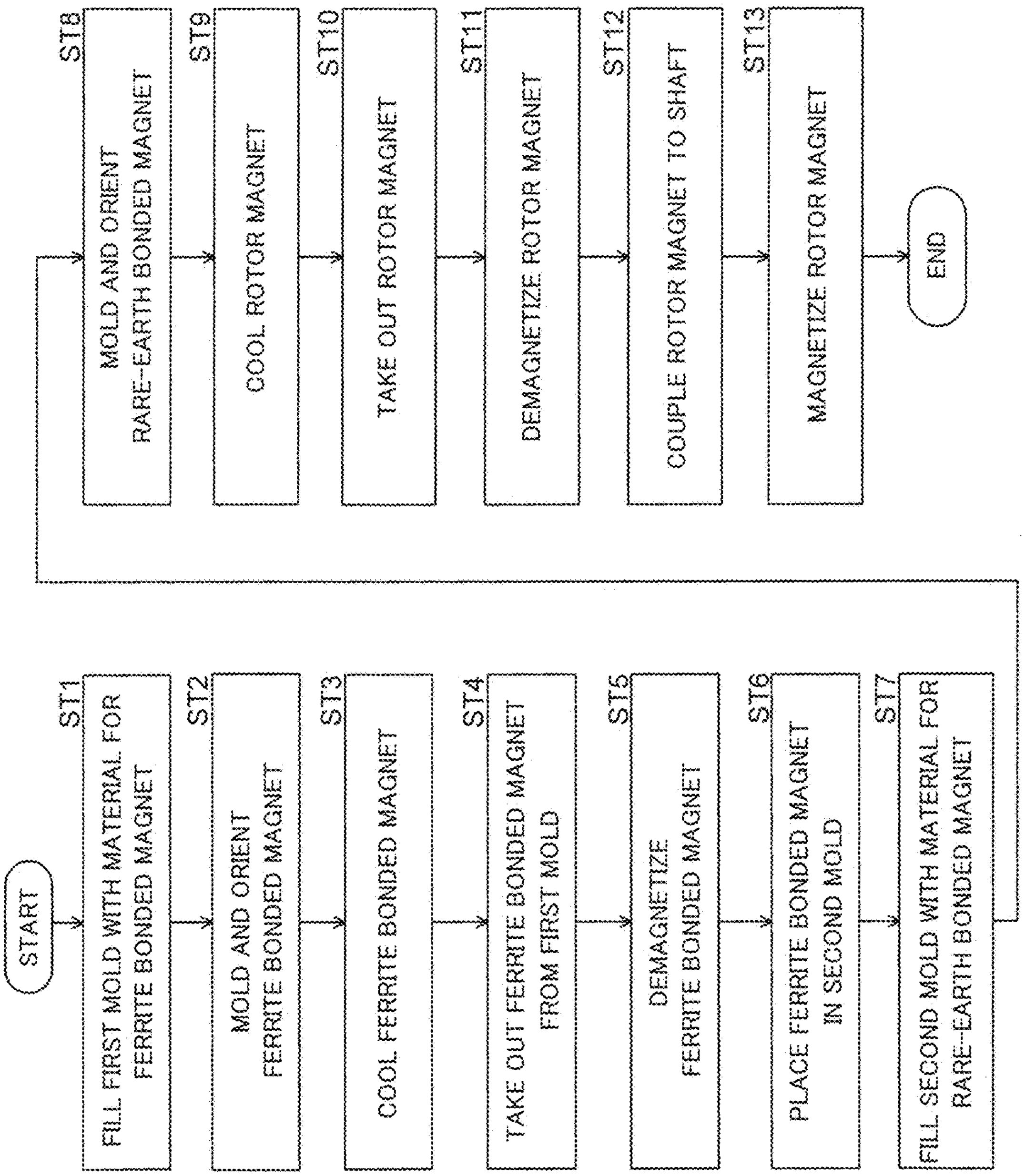
FIG. 7 is a flowchart illustrating a manufacturing method of a rotor according to the first embodiment.

Next, a manufacturing method of the rotor 1 will be described. FIG. 7 is a flowchart illustrating a manufacturing process of the rotor 1. In the manufacturing process of the rotor 1, a first mold for molding the ferrite bonded magnet 20, a second mold for molding the rare-earth bonded magnets 30, magnets for orientation, and a magnetizer are used.

In step ST1, the inside of the first mold for molding the ferrite bonded magnet 20 is filled with a material for the ferrite bonded magnet 20. The ferrite bonded magnet 20 is molded by injection molding, for example. The molding method of the ferrite bonded magnet 20 is not limited to injection molding, and may be other molding method such as pressure molding.

In step ST2, the ferrite bonded magnet 20 is molded into a predetermined shape while being oriented. In step ST2, for example, in a state where a magnetic field having a polar anisotropy is generated inside the first mold by using the magnets for orientation, the ferrite bonded magnet 20 is molded so that the material for the ferrite bonded magnet 20 is oriented. In this manner, the ferrite bonded magnet 20 having polar anisotropy is molded.

In step ST3, the molded ferrite bonded magnet 20 is cooled.

In step ST4, the ferrite bonded magnet 20 is taken out from the first mold.

In step ST5, the resulting ferrite bonded magnet 20 is demagnetized.

In step ST6, the ferrite bonded magnet 20 is placed in the second mold for injection molding of the rare-earth bonded magnets 30.

In step ST7, the second mold is filled with the material for the rare-earth bonded magnets 30. The rare-earth bonded magnets 30 are molded by injection molding, for example. The rare-earth bonded magnets 30 may also be molded by other molding methods such as pressure molding as well as injection molding.

Figure 8:
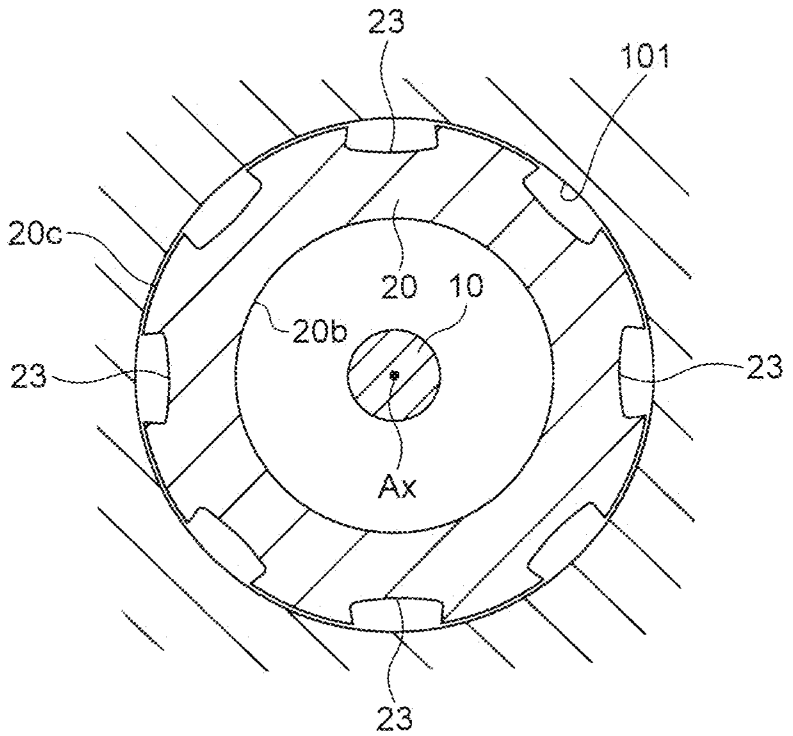
FIG. 8 is a schematic view illustrating a second mold for use in the manufacturing method of the rotor according to the first embodiment.

As an example, as schematically illustrated in FIG. 8, the grooves 23 of the ferrite bonded magnet 20 placed in the second mold are filled with the material for the rare-earth bonded magnets 30. Since the grooves 23 are open at the end surface 20*a* of the ferrite bonded magnet 20 (FIG. 4(B)), the grooves 23 can be easily filled with the material for the rare-earth bonded magnets 30.

In step ST8, while the material for the rare-earth bonded magnets 30 is oriented, the rare-earth bonded magnets 30 are shaped into predetermined shapes. In step ST8, in a state where a magnetic field having a polar anisotropy is generated in the second mold by using the magnet for orientation, for example, the rare-earth bonded magnets 30 are molded so that the material for the rare-earth bonded magnets 30 are oriented. In this manner, the rotor magnet 50 in which the ferrite bonded magnet 20 and the plurality of rare-earth bonded magnets 30 are integrally molded is formed.

In step ST9, the rotor magnet 50 formed in step ST8 is cooled.

In step ST10, the cooled rotor magnet 50 is taken out from the second mold.

In step ST11, the rotor magnet 50 taken out in step ST10 is demagnetized.

In step ST12, the rotor magnet 50 is coupled to the shaft 10. As an example, the rotor magnet 50 and the shaft 10 are placed in a third mold, and the third mold is filled with a thermoplastic resin such as PBT, and the resin portion 40 is molded. Accordingly, the rotor magnet 50 is coupled to the shaft 10 through the resin portion 40.

In step ST13, the rotor magnet 50 is magnetized by using a magnetizer, for example. In this manner, the rotor 1 is completed.

In the example described here, the overhang portion 52 does not include the rare-earth bonded magnets 30 and includes only the ferrite bonded magnet 20. However, it is sufficient that a volume ratio of the rare-earth bonded magnets 30 to the ferrite bonded magnet 20 is smaller in the overhang portion 52 than in the stator-facing portion 51.

As an example, the volume ratio of the rare-earth bonded magnets 30 to the ferrite bonded magnet 20 is, for example, 25% in stator-facing portion 51, and is, for example, 0% in the overhang portion 52. An example in which the volume ratio of the rare-earth bonded magnets 30 is larger than 0% in the overhang portion 52 will be described in a third embodiment.

Although description has been made of the configuration in which the overhang portion 52 is provided only on one end of the rotor magnet 50 in the axial direction, the overhang portion 52 may be provided on each end of the rotor magnet 50 in the axial direction. In this regard, the configuration in which the overhang portion 52 is provided only on one end of the rotor magnet 50 in the axial direction is more preferable. This is because the grooves 23 are open at the end surface 20*a* of the ferrite bonded magnet 20 (see FIG. 4(B)), and thus the grooves 23 can be easily filled with the material for the rare-earth bonded magnets 30 in step ST7 in FIG. 7, so that the manufacturing process is simplified.

Advantages of First Embodiment

As described above, in the first embodiment, the rotor magnet 50 of the rotor 1 includes the ferrite bonded magnet 20 as a first magnet and the P rare-earth bonded magnets 30 (P is an integer of two or more) as second magnets. The ferrite bonded magnet 20 is magnetized so as to have polar-anisotropic orientation. The rare-earth bonded magnets 30 are provided on the outer circumference of the ferrite bonded magnet 20, magnetized so as to have polar-anisotropic orientation, and have a stronger magnetic pole than the ferrite bonded magnet 20. The length Hr of the rotor magnet 50 in the axial direction and the length Hs of the stator core 61 in the axial direction satisfy Hr>Hs. The rotor magnet 50 includes, in the axial direction, the stator-facing portion 51 facing the stator core 61 in the radial direction and the overhang portion 52 projecting from the stator core 61 in the axial direction. The volume ratio of the rare-earth bonded magnets 30 to the ferrite bonded magnet 20 is smaller in the overhang portion 52 than in the stator-facing portion 51.

Since the rare-earth bonded magnets 30 are distributed in the circumferential direction as above, the amount of use of the rare-earth bonded magnets 30 can be reduced, and the manufacturing cost of the motor 100 can be reduced. In addition, since the rotor magnet 50 includes the stator-facing portion 51 and the overhang portion 52, effective magnetic fluxes flowing into the stator core 61 can be increased. Further, since the volume ratio of the rare-earth bonded magnets 30 to the ferrite bonded magnet 20 is smaller in the overhang portion 52 than in the stator-facing portion 51, the manufacturing cost can be reduced without decrease in output and efficiency of the motor 100.

In particular, since the overhang portion 52 of the rotor magnet 50 does not include the rare-earth bonded magnets 30 and includes only the ferrite bonded magnet 20, the amount of use of the rare-earth bonded magnets 30 can be further reduced, and the manufacturing cost can be further reduced.

Second Embodiment

Figure 9A:
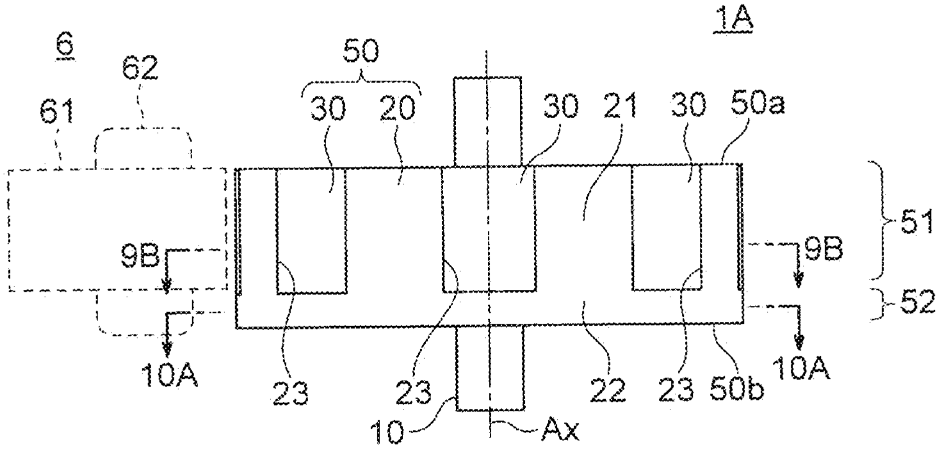
FIG. 9(A) is a side view illustrating a rotor according to a second embodiment.

Next, a second embodiment will be described. A motor according to the second embodiment is different from the motor 100 of the first embodiment in the configuration of a rotor 1A. FIG. 9(A) is a side view illustrating the rotor 1A according to the second embodiment. In FIG. 9(A), a part of the stator 6 is indicated by broken lines.

Similarly to the rotor 1 of the first embodiment, the rotor 1A includes the shaft 10 and the rotor magnet 50. The rotor magnet 50 includes the ferrite bonded magnet 20 as a first magnet and the plurality of rare-earth bonded magnets 30 as second magnets. The rotor magnet 50 includes the stator-facing portion 51 and the overhang portion 52 in the axial direction.

Figure 9B:
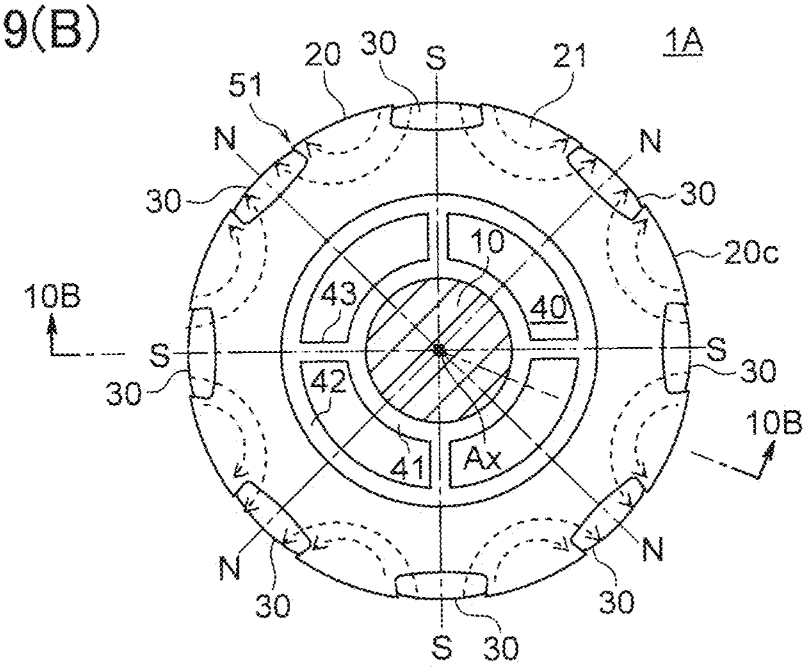
FIG. 9(B) is a sectional view taken along line 9B-9B shown in FIG. 9(A).

FIG. 9(B) is a sectional view taken along line 9B-9B shown in FIG. 9(A), that is, a sectional view of the rotor 1A in a plane passing through the stator-facing portion 51. As illustrated in FIG. 9(B), in the second embodiment, the shape of grooves 23 of the ferrite bonded magnet 20 and the shape of the rare-earth bonded magnets 30 are different from those in the first embodiment.

Figure 9C:
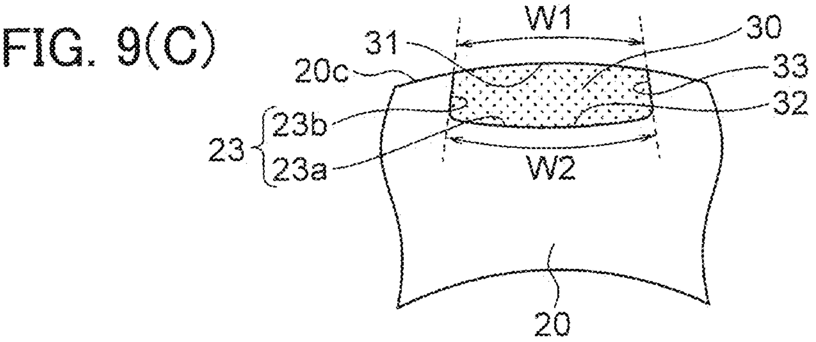
FIG. 9(C) is an enlarged sectional view illustrating a rare-earth bonded magnet of the rotor and its surroundings.

FIG. 9(C) is an enlarged view illustrating one groove 23 of the ferrite bonded magnet 20 and the rare-earth bonded magnet 30 disposed in the groove 23. The groove 23 has a bottom surface 23*a* and side surfaces 23*b*. The bottom surface 23*a* is a surface of the groove 23 facing outward in the radial direction. The side surfaces 23*b* extend outward in the radial direction from both ends of the bottom surface 23*a* in the width direction.

The bottom surface 23*a* extends in an arc shape projecting inward in the radial direction in FIG. 9(C), but is not limited to this shape. The bottom surface 23*a* may extend in an arc shape projecting outward in the radial direction or may extend linearly.

The rare-earth bonded magnet 30 has an outer circumferential surface 31 facing outward in the radial direction, an inner circumferential surface 32 facing inward in the radial direction, and side surfaces 33 at both sides in the circumferential direction. The outer circumferential surface 31 extends in an arc shape about a center axis Ax. The inner circumferential surface 32 extends in an arc shape projecting inward in the radial direction. In this regard, the inner circumferential surface 32 may extend in an arc shape projecting outward in the radial direction or may extend linearly as long as the inner circumferential surface 32 has a shape in conformity with the bottom surface 23*a*.

In a plane orthogonal to the center axis Ax, a length W2 of the inner circumferential surface 32 of the rare-earth bonded magnet 30 is longer than a length W1 of the outer circumferential surface 31 of the rare-earth bonded magnet 30. Thus, in a plane orthogonal to the center axis Ax, the length of the bottom surface 23*a* of the groove 23 of the ferrite bonded magnet 20 is longer than the length of an opening of the groove 23 on the outer circumference 20*c* side.

With this configuration, the rare-earth bonded magnets 30 can be held in the groove 23 of the ferrite bonded magnet 20 so that the rare-earth bonded magnets 30 are not detached outward in the radial direction. Accordingly, detachment of the rare-earth bonded magnets 30 from the ferrite bonded magnet 20 can be prevented, even when separation occurs at an interface between the ferrite bonded magnet 20 and each rare-earth bonded magnet 30 due to a difference in thermal expansion coefficient between the ferrite bonded magnet 20 and the rare-earth bonded magnet 30 or when a centrifugal force caused by rotation of the rotor 1A is exerted thereon.

Figure 10A:
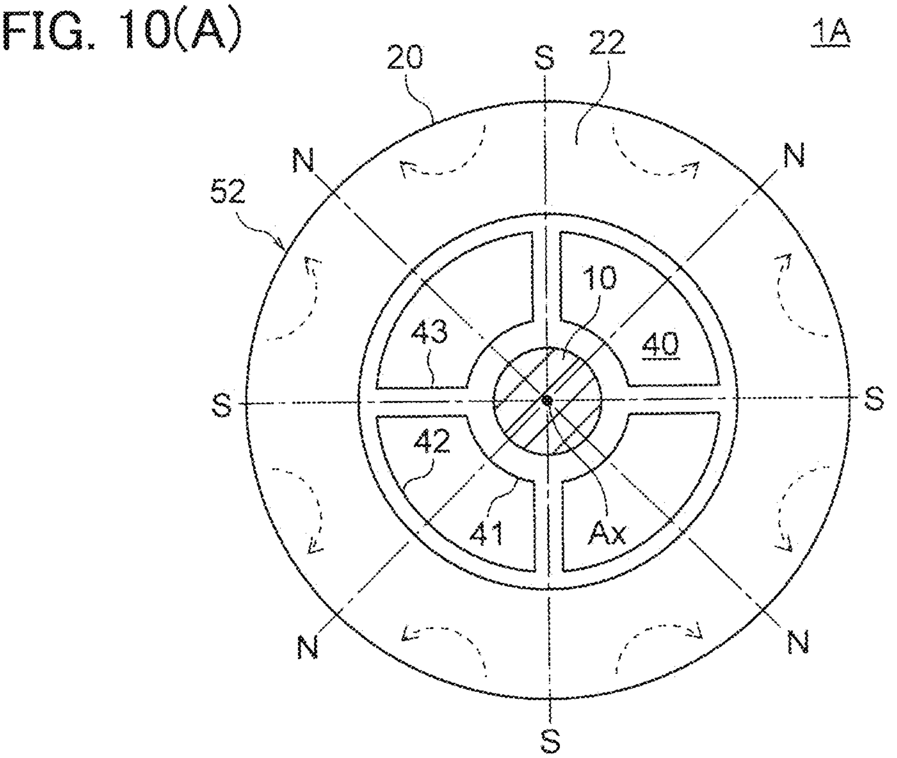
FIG. 10(A) is a sectional view taken along line 10A-10A shown in FIG. 9(A).
Figure 10B:
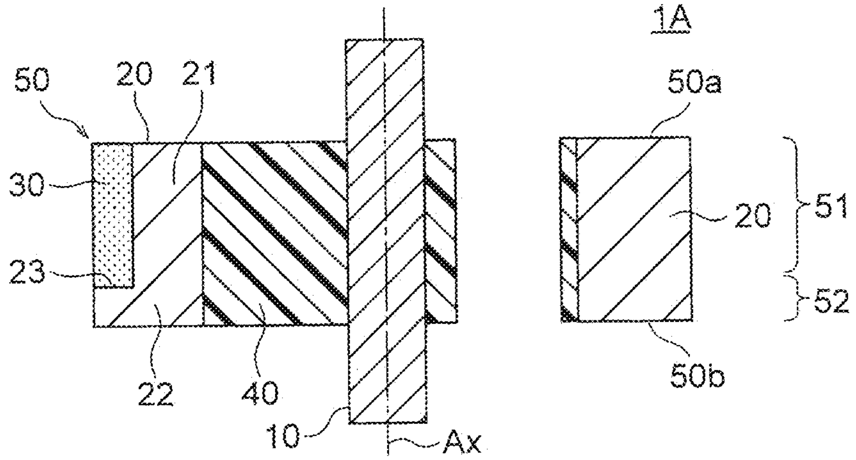
FIG. 10(B) is a sectional view taken along line 10B-10B shown in FIG. 9(B).

FIG. 10(A) is a sectional view taken along line 10A-10A shown in FIG. 9(A), that is, a sectional view of the rotor 1A in a plane passing through the overhang portion 52. FIG. 10(B) is a sectional view taken along line 10B-10B shown in FIG. 9(B). As illustrated in FIGS. 10(A) and 10(B), the configuration of the overhang portion 52 of the rotor magnet 50 is similar to that in the first embodiment.

Except for the aspects described above, the rotor 1A of the second embodiment is configured in a similar manner to the rotor 1 of the first embodiment.

As described above, in the second embodiment, since the length W2 of the inner circumferential surface 32 of the rare-earth bonded magnet 30 is longer than the length W1 of the outer circumferential surface 31 of the rare-earth bonded magnet 30, detachment of the rare-earth bonded magnets 30 from the ferrite bonded magnet 20 can be prevented, and reliability of the motor can be enhanced.

Third Embodiment

Figure 11A:
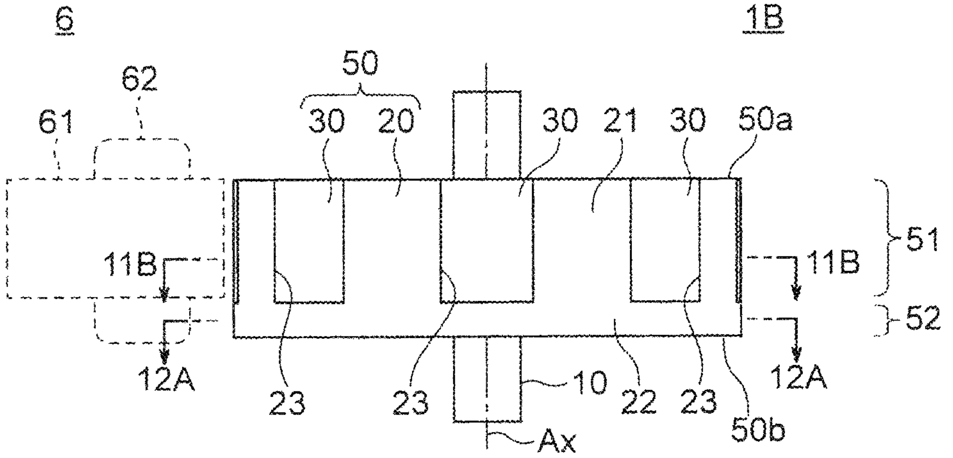
FIG. 11(A) is a side view illustrating a rotor according to a third embodiment.

Next, a third embodiment will be described. A motor according to the third embodiment is different from the motor 100 of the first embodiment in a configuration of a rotor 1B. FIG. 11(A) is a side view illustrating the rotor 1B according to the third embodiment. In FIG. 11(A), a part of a stator 6 is indicated by broken lines.

Similarly to the rotor 1 of the first embodiment, the rotor 1B includes the shaft 10 and the rotor magnet 50. The rotor magnet 50 includes the ferrite bonded magnet 20 as a first magnet and the plurality of rare-earth bonded magnets 30 as second magnets. The rotor magnet 50 includes the stator-facing portion 51 and the overhang portion 52 in the axial direction.

Figure 11B:
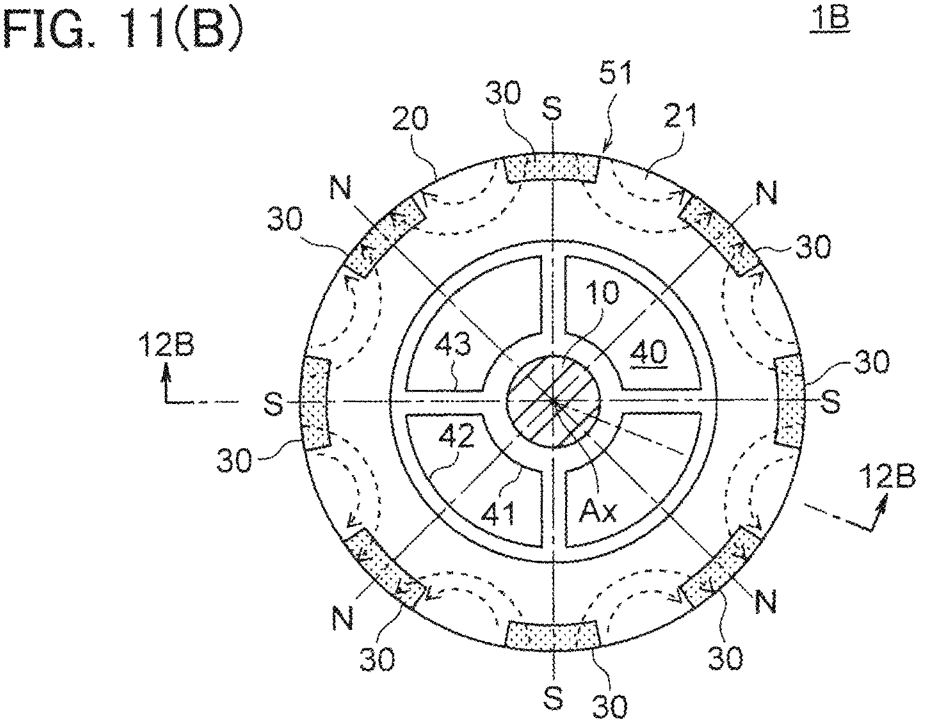
FIG. 11(B) is a sectional view taken along line 11B-11B shown in FIG. 11(A).

FIG. 11(B) is a sectional view taken along line 11B-11B shown in FIG. 11(A), that is, a sectional view of the rotor 1B in a plane passing through the stator-facing portion 51. As illustrated in FIG. 11(B), the shape of the stator-facing portion 51 of the third embodiment is the same as that of the first embodiment.

Figure 12A:
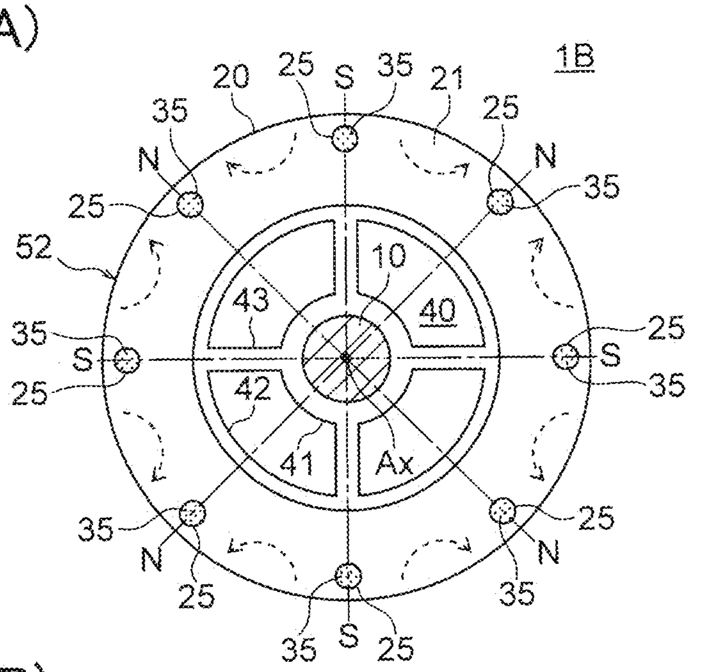
FIG. 12(A) is a sectional view taken along line 12A-12A shown in FIG. 11(A).
Figure 12B:
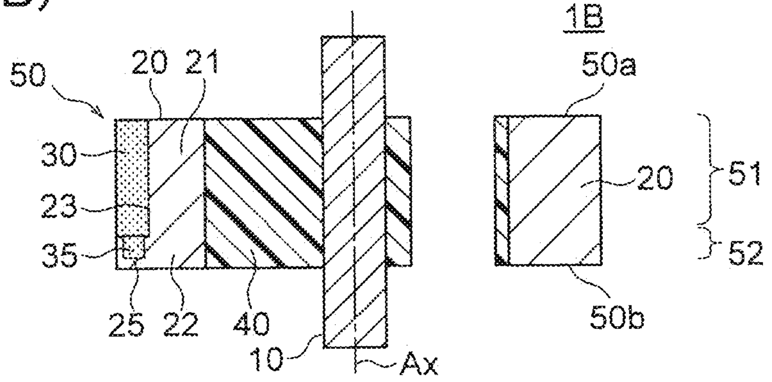
FIG. 12(B) is a sectional view taken along line 12B-12B shown in FIG. 11(B).

FIG. 12(A) is a sectional view taken along line 12A-12A shown in FIG. 11(A), that is, a sectional view of the rotor 1B in a plane passing through the overhang portion 52. FIG. 12(B) is a sectional view taken along line 12B-12B shown in FIG. 11(B).

As illustrated in FIG. 12(A), recesses 25 are formed in the ferrite bonded magnet 20 of the overhang portion 52, that is, in the second portion 22, and are located at positions corresponding to magnetic pole centers of the north poles and the south poles. The recesses 25 are holes having circular cross sections in this example, but the cross-sectional shapes of the recesses 25 are not limited to the circular shapes.

As illustrated in FIG. 12(B), the recesses 25 are continuously formed in the axial direction from the grooves 23. The rare-earth bonded magnets 30 have projections 35 that are housed in the recesses 25. The recesses 25 will also be referred to as first engagement portions, and the projections 35 will also be referred to as second engagement portions.

The projections 35 of the rare-earth bonded magnets 30 are formed in the process of step ST7 in FIG. 7. That is, when the grooves 23 of the ferrite bonded magnet 20 disposed in a second mold are filled with a material for the rare-earth bonded magnets 30, the material also fills the recesses 25 from the grooves 23 to form the projections 35.

In the third embodiment, the overhang portion 52 includes the rare-earth bonded magnets 30 (i.e., projections 35) as well as the ferrite bonded magnet 20. In this regard, a volume ratio of the rare-earth bonded magnets 30 to the ferrite bonded magnet 20 is smaller in the overhang portion 52 than in the stator-facing portion 51.

Since the projections 35 of the rare-earth bonded magnet 30 are engaged with the recesses 25 of the ferrite bonded magnet 20, the rare-earth bonded magnets 30 can be firmly fixed to the ferrite bonded magnet 20. That is, detachment of the rare-earth bonded magnets 30 from the ferrite bonded magnet 20 can be prevented, even when separation occurs at the interface between the ferrite bonded magnet 20 and each rare-earth bonded magnet 30 due to a difference in thermal expansion coefficient between the ferrite bonded magnet 20 and the rare-earth bonded magnet 30 or when a centrifugal force due to rotation of the rotor 1B is exerted thereon.

Except for the aspects described above, the rotor 1B of the third embodiment is configured in a similar manner to the rotor 1 of the first embodiment. As described in the second embodiment, the length W2 of the inner circumferential surface 32 of the rare-earth bonded magnet 30 may be longer than the length W1 of the outer circumferential surface 31 of the rare-earth bonded magnet 30.

As described above, in the third embodiment, since the projections 35 of the rare-earth bonded magnets 30 are engaged with the recesses 25 of the ferrite bonded magnet 20, detachment of the rare-earth bonded magnets 30 from the ferrite bonded magnet 20 is prevented, and reliability of the motor can be enhanced.

Figure 12C:
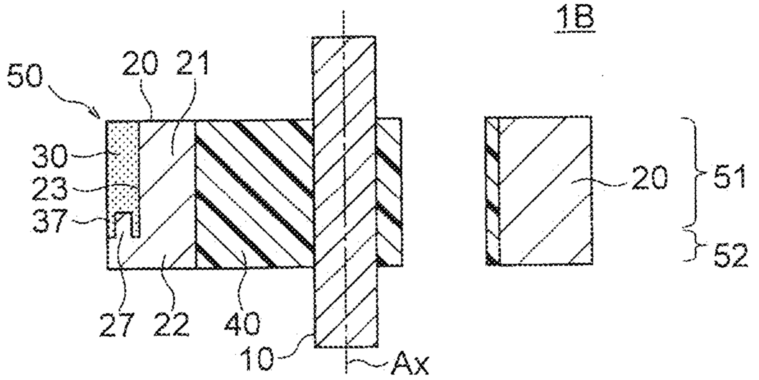
FIG. 12(C) is a sectional view illustrating a rotor according to a modification.

The example in which the ferrite bonded magnet 20 includes the recesses 25 and the rare-earth bonded magnets 30 include the projections 35 has been described. However, the ferrite bonded magnet 20 may include projections 27 and the rare-earth bonded magnets 30 may include recesses 37, as shown in a modification of FIG. 12(C).

In this case, in the process of step ST7 in FIG. 7, the recesses 37 can be formed by molding the rare-earth bonded magnets 30 to cover the projections 27 of the ferrite bonded magnet 20. Also in this modification, due to the engagement between the projections 27 of the ferrite bonded magnet 20 and the recesses 37 of the rare-earth bonded magnets 30, the effect of preventing detachment of the rare-earth bonded magnets 30 can be obtained.

Fourth Embodiment

Figure 13A:
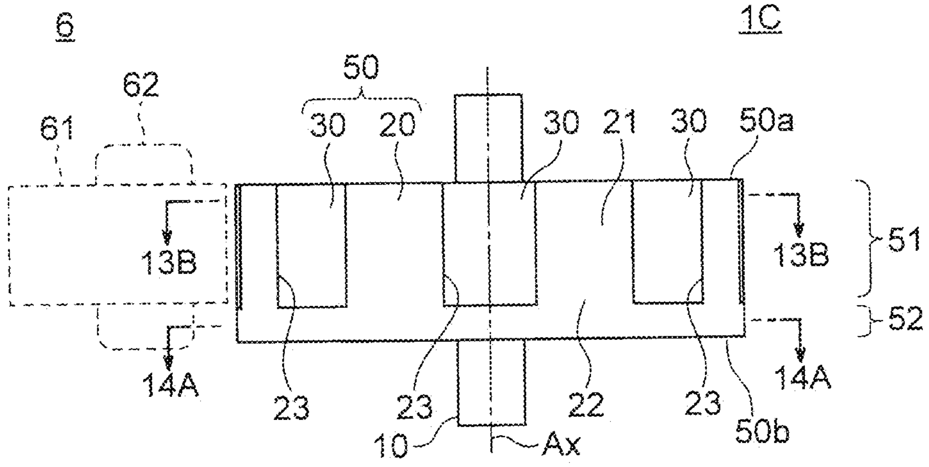
FIG. 13(A) is a side view illustrating a rotor according to a fourth embodiment.

Next, a fourth embodiment will be described. A motor according to the fourth embodiment is different from the motor 100 of the first embodiment in a configuration of a rotor 1C. FIG. 13(A) is a side view illustrating the rotor 1C according to the fourth embodiment. In FIG. 13(A), a part of a stator 6 is indicated by broken lines.

Similarly to the rotor 1 of the first embodiment, the rotor 1C includes the shaft 10 and the rotor magnet 50. The rotor magnet 50 includes the ferrite bonded magnet 20 as a first magnet and the plurality of rare-earth bonded magnets 30 as second magnets. The rotor magnet 50 includes the stator-facing portion 51 and the overhang portion 52 in the axial direction.

Figure 13B:
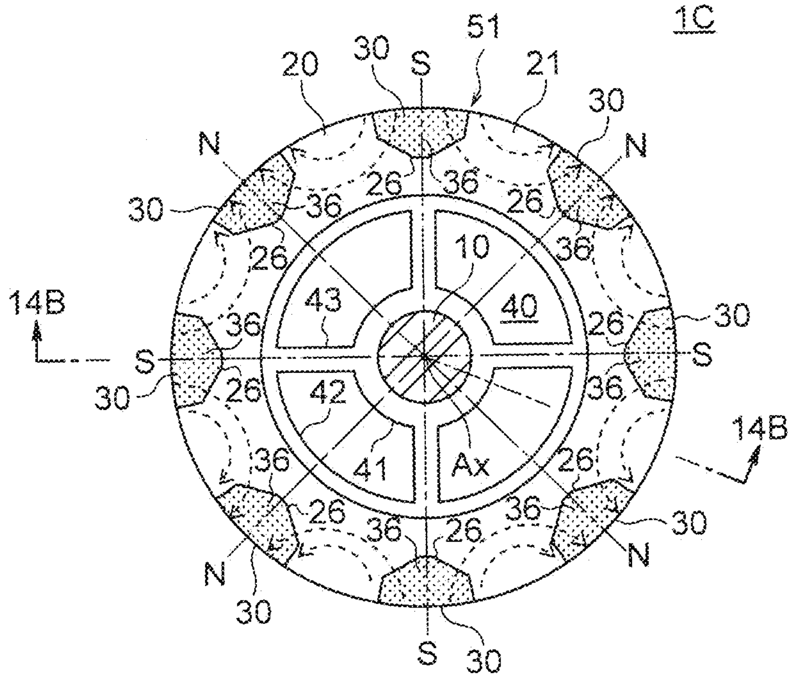
FIG. 13(B) is a sectional view taken along line 13B-13B shown in FIG. 13(A).

FIG. 13(B) is a sectional view taken along line 13B-13B shown in FIG. 13(A), that is, a sectional view of the rotor 1C in a plane passing through a portion of the rotor magnet 50*a* closer to the first end surface 50*a*. Each of the rare-earth bonded magnets 30 includes a protrusion 36 projecting inward in the radial direction at an end on the first end surface 50*a* side. The protrusions 36 of the rare-earth bonded magnets 30 are exposed at the first end surface 50*a* of the rotor magnet 50 (FIG. 13(A)).

Figure 14A:
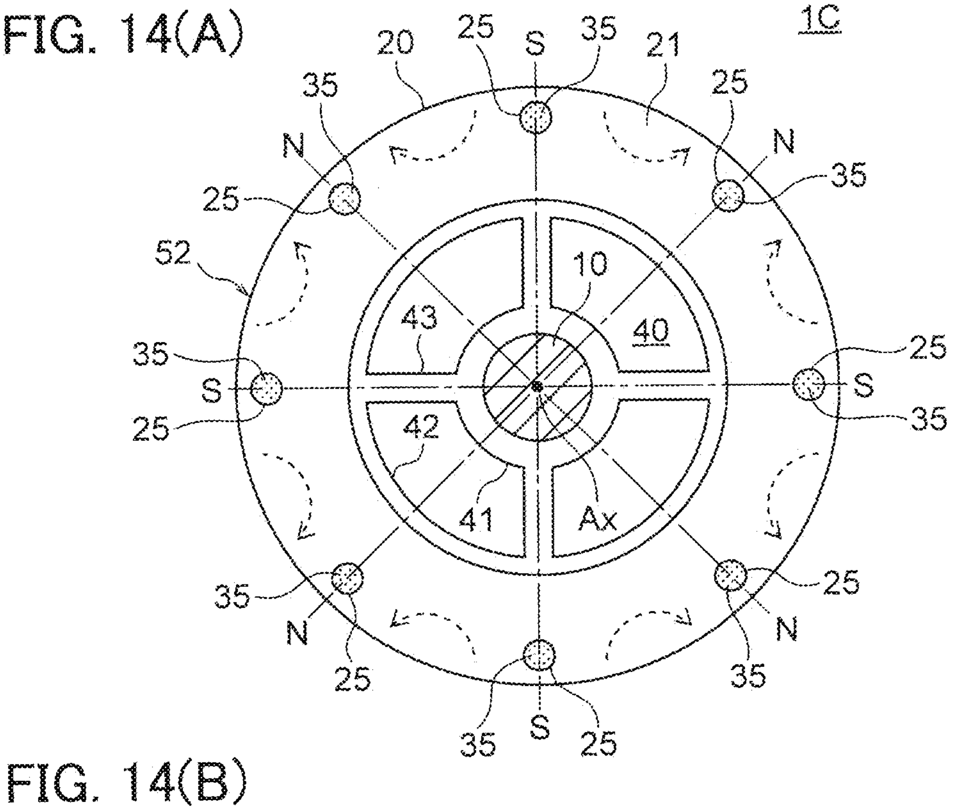
FIG. 14(A) is a sectional view taken along line 14A-14A shown in FIG. 13(A).
Figure 14B:
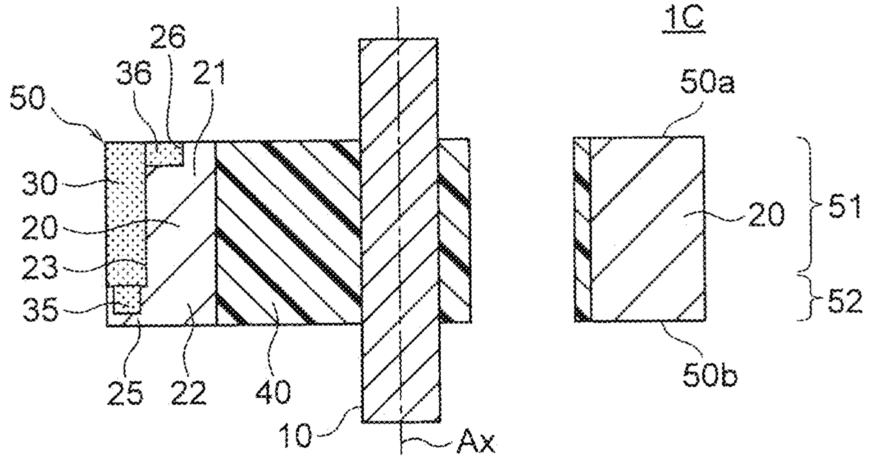
FIG. 14(B) is a sectional view taken along line 14B-14B shown in FIG. 13(B).

FIG. 14(A) is a sectional view taken along line 14A-14A shown in FIG. 13(A), that is, a sectional view of the rotor 1C in a plane passing through the overhang portion 52. FIG. 14(B) is a sectional view taken along line 14B-14B shown in FIG. 13(B). As illustrated in FIG. 14(A), the recesses 25 described in the third embodiment are formed in the ferrite bonded magnet 20 of the overhang portion 52, that is, the second portion 22. The projections 35 of the rare-earth bonded magnets 30 described in the third embodiment are housed inside the recesses 25.

As illustrated in FIG. 14(B), the ferrite bonded magnet 20 (i.e., first portion 21) in the stator-facing portion 51 includes receiving portions 26 extending inward in the radial direction form the grooves 23 along the first end surface 50*a*. The receiving portions 26 house the protrusions 36 of the rare-earth bonded magnets 30. The receiving portion 26 is formed to have a stepped shape with respect to the groove 23 in the section of FIG. 14(B), and thus the receiving portion 26 will also be referred to as a stepped portion.

The protrusions 36 of the rare-earth bonded magnets 30 are formed in the process of step ST7 in FIG. 7. That is, when the grooves 23 of the ferrite bonded magnet 20 disposed in a mold are filled with a material for the rare-earth bonded magnets 30, the material also fills the receiving portions 26 from the grooves 23 to form the protrusions 36.

Since the protrusions 36 of the rare-earth bonded magnet 30 are engaged with the receiving portions 26 of the ferrite bonded magnet 20, the rare-earth bonded magnets 30 can be firmly fixed to the ferrite bonded magnet 20. That is, detachment of the rare-earth bonded magnets 30 can be prevented, even when separation occurs at the interface between the ferrite bonded magnet 20 and each rare-earth bonded magnet 30 due to a difference in thermal expansion coefficient between the ferrite bonded magnet 20 and the rare-earth bonded magnet 30 or when a centrifugal force due to rotation of the rotor 1C is exerted thereon.

Except for the aspects described above, the rotor 1C of the fourth embodiment is configured in a similar manner to the rotor 1 of the first embodiment.

As described above, in the fourth embodiment, since the protrusions 36 of the rare-earth bonded magnets 30 are engaged with the receiving portions 26 of the ferrite bonded magnet 20, detachment of the rare-earth bonded magnets 30 from the ferrite bonded magnet 20 can be prevented, and reliability of the motor can be enhanced. In addition, since the protrusions 36 of the rare-earth bonded magnets 30 are formed at an end of the rotor magnet 50 on the first end surface 50*a* side, molding by means of a mold can be facilitated.

In this regard, although the rotor magnet 50 includes the recesses 25 and the projections 35 described in the third embodiment in FIGS. 14(A) and 14(B), the rotor magnet 50 does not necessarily include the recesses 25 and the projections 35. Further, the projections 27 and the recesses 37 shown in FIG. 12(C) may be provided. As described in the second embodiment, the length W2 of the inner circumferential surface 32 of the rare-earth bonded magnet 30 may be longer than the length W1 of the outer circumferential surface 31 of the rare-earth bonded magnet 30.

Fifth Embodiment

Figure 15A:
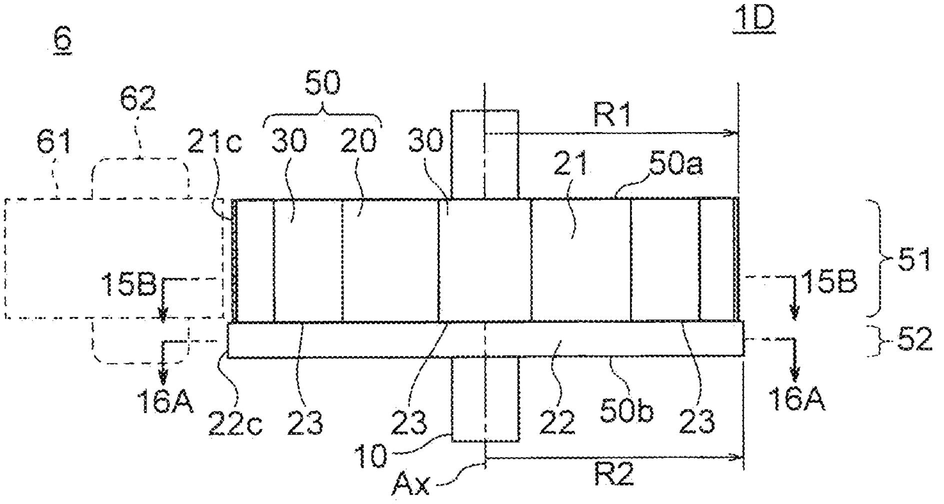
FIG. 15(A) is a side view illustrating a rotor according to a fifth embodiment.

Next, a fifth embodiment will be described. A motor according to the fifth embodiment is different from the motor 100 of the first embodiment in a configuration of a rotor 1D. FIG. 15(A) is a side view illustrating the rotor 1D according to the fifth embodiment. In FIG. 15(A), a part of a stator 6 is indicated by broken lines.

Similarly to the rotor 1 of the first embodiment, the rotor 1D includes the shaft 10 and the rotor magnet 50. The rotor magnet 50 includes the ferrite bonded magnet 20 as a first magnet and the plurality of rare-earth bonded magnets 30 as second magnets. The rotor magnet 50 includes the stator-facing portion 51 and the overhang portion 52 in the axial direction.

Figure 15B:
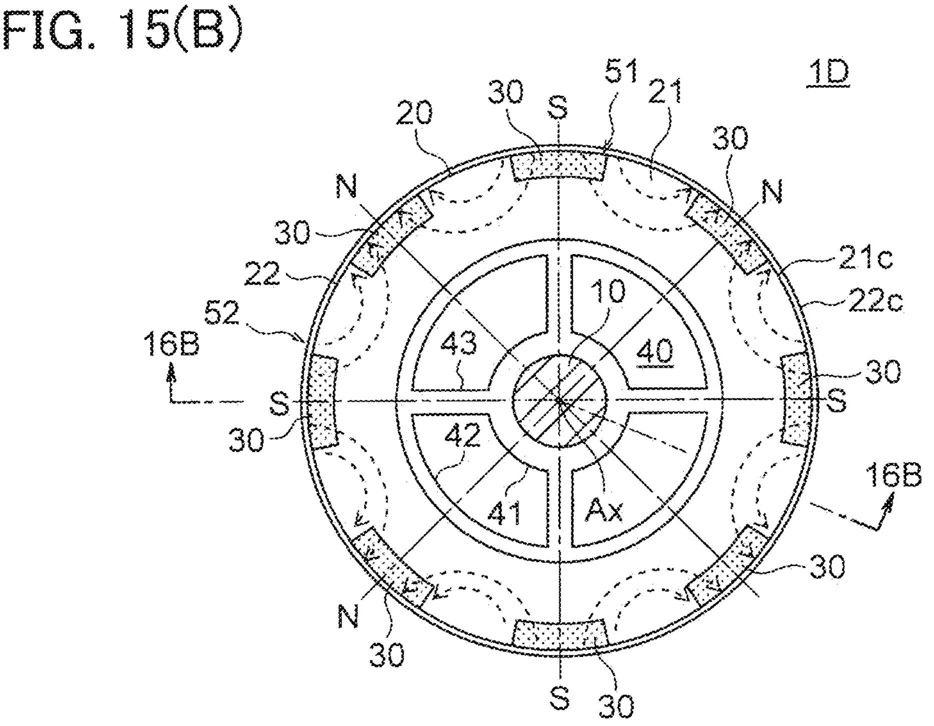
FIG. 15(B) is a sectional view taken along line 15B-15B shown in FIG. 15(A).

FIG. 15(B) is a sectional view taken along line 15B-15B shown in FIG. 15(A), that is, a sectional view of the rotor 1D in a plane passing through the stator-facing portion 51. As illustrated in FIGS. 15(A) and 15(B), the outer diameter of the second portion 22 of the ferrite bonded magnet 20 is larger than the outer diameter of the first portion 21 of the ferrite bonded magnet 20. In other words, an outer circumference 22*c* of the second portion 22 projects outward in the radial direction with respect to an outer circumference 21*c* of the first portion 21.

Accordingly, in the rotor 1D, the outer diameter of the overhang portion 52 is larger than the outer diameter of the stator-facing portion 51. More specifically, a distance R1 from the center axis Ax to the outer circumference of the stator-facing portion 51 and a distance R2 from the center axis Ax to the outer circumference of the overhang portion 52 satisfy $R1<R2$.

Figure 16A:
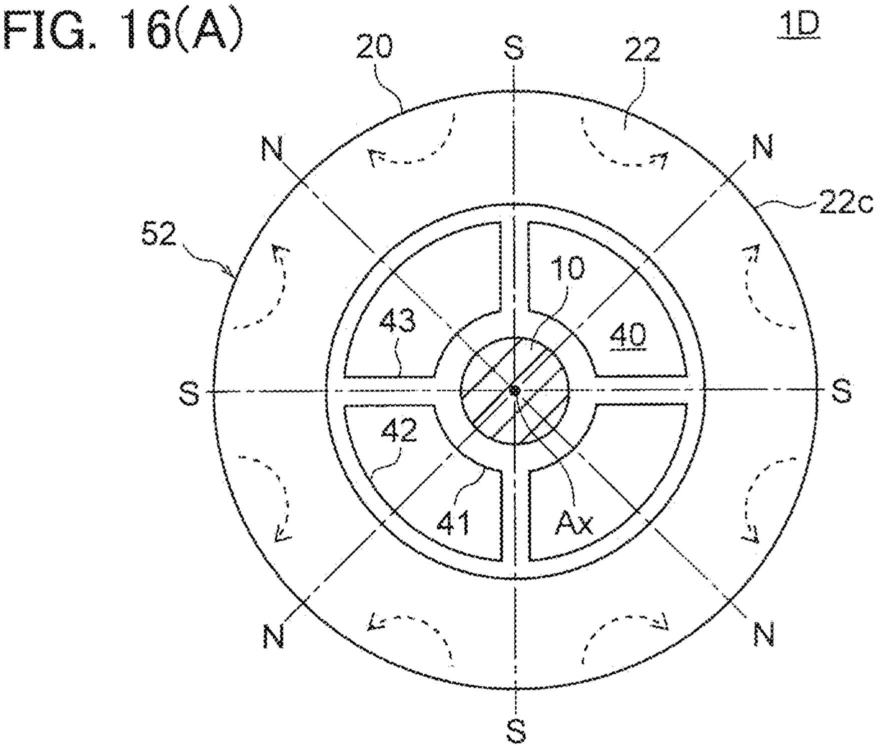
FIG. 16(A) is a sectional view taken along line 16A-16A shown in FIG. 15(A).
Figure 16B:
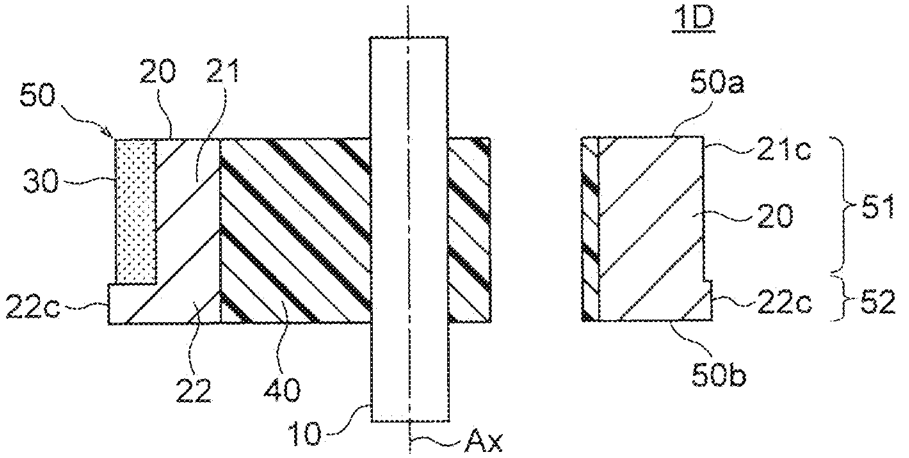
FIG. 16(B) is a sectional view taken along line 16B-16B shown in FIG. 15(B).

FIG. 16(A) is a sectional view taken along line 16A-16A shown in FIG. 15(A), that is, a sectional view of the rotor 1D in a plane passing through the overhang portion 52. FIG. 16(B) is a sectional view taken along line 16B-16B shown in FIG. 15(B). As illustrated in FIGS. 16(A) and 16(B), the ferrite bonded magnet 20 is formed similarly to the ferrite bonded magnet 20 of the first embodiment except that the outer diameter of the second portion 22 is larger than the outer diameter of the first portion 21. The rare-earth bonded magnets 30 are formed similarly to the rare-earth bonded magnets 30 of the first embodiment.

The stator-facing portion 51 faces the stator core 61 via an air gap, and thus there is a limitation in increasing the outer diameter of the stator-facing portion 51. On the other hand, the overhang portion 52 protrudes from the stator core 61 in the axial direction, and thus the outer diameter of the overhang portion 52 can be made larger than the outer diameter of the stator-facing portion 51.

By increasing the outer diameter of the overhang portion 52 as above, magnetic fluxes flowing into the stator core 61 by way of the overhang portion 52 can be increased.

Except for the aspects described above, the rotor 1D of the fifth embodiment is configured in a similar manner to the rotor 1 of the first embodiment.

As described above, in the fifth embodiment, since the outer diameter of the overhang portion 52 is larger than the outer diameter of the stator-facing portion 51, magnetic fluxes flowing into the stator core 61 can be increased.

The fifth embodiment may be combined with features described in the second embodiment, the third embodiment, the modification, or the fourth embodiment.

Sixth Embodiment

Figure 17A:
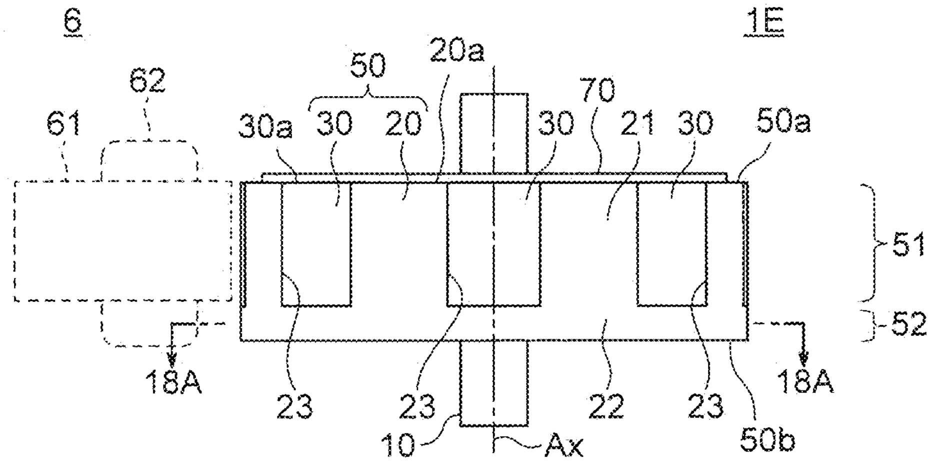
FIG. 17(A) is a side view illustrating a rotor according to a sixth embodiment.
Figure 17B:
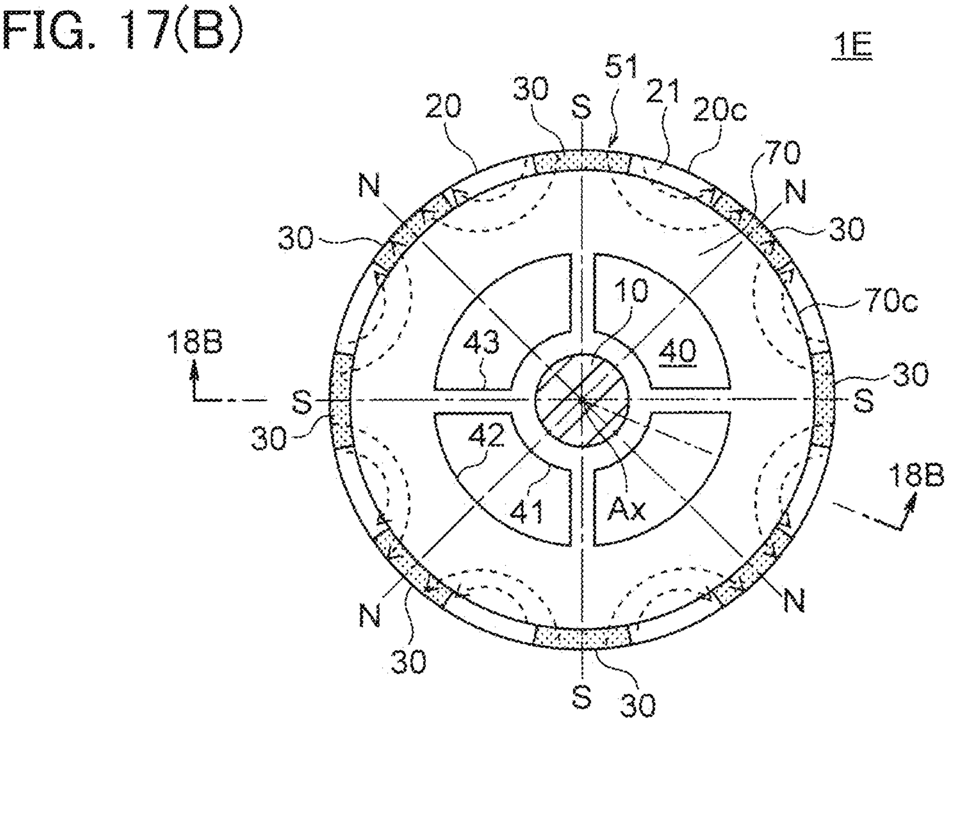
FIG. 17(B) is a plan view illustrating the rotor according to the sixth embodiment.

Next, a sixth embodiment will be described. A motor according to the sixth embodiment is different from the motor 100 of the first embodiment in a configuration of a rotor 1E. FIG. 17(A) is a side view illustrating the rotor 1E according to the sixth embodiment. FIG. 17(B) is a plan view illustrating the rotor 1E. In FIG. 17(A), a part of a stator 6 is indicated by broken lines.

Similarly to the rotor 1 of the first embodiment, the rotor 1E includes the shaft 10 and the rotor magnet 50. The rotor magnet 50 includes the ferrite bonded magnet 20 as a first magnet and the plurality of rare-earth bonded magnets 30 as second magnets. The rotor magnet 50 includes the stator-facing portion 51 and the overhang portion 52 in the axial direction.

As illustrated in FIGS. 17(A) and 17(B), the rotor 1E includes a ring-shaped cover member 70 that covers the first end surface 50*a* of the rotor magnet 50. The cover member 70 covers the end surface 20*a* of the ferrite bonded magnet 20 and also covers the end surfaces 30*a* of the rare-earth bonded magnets 30. It is sufficient that the cover member 70 covers at least a portion of each of the ferrite bonded magnet 20 and at least a portion of the rare-earth bonded magnets 30.

The cover member 70 is made of a resin. More specifically, the cover member 70 is made of a resin different from those of the ferrite bonded magnet and the rare-earth bonded magnets. In particular, the cover member 70 is preferably made of the same material as the resin portion 40, for example, a thermoplastic resin such as PBT.

Figure 18A:
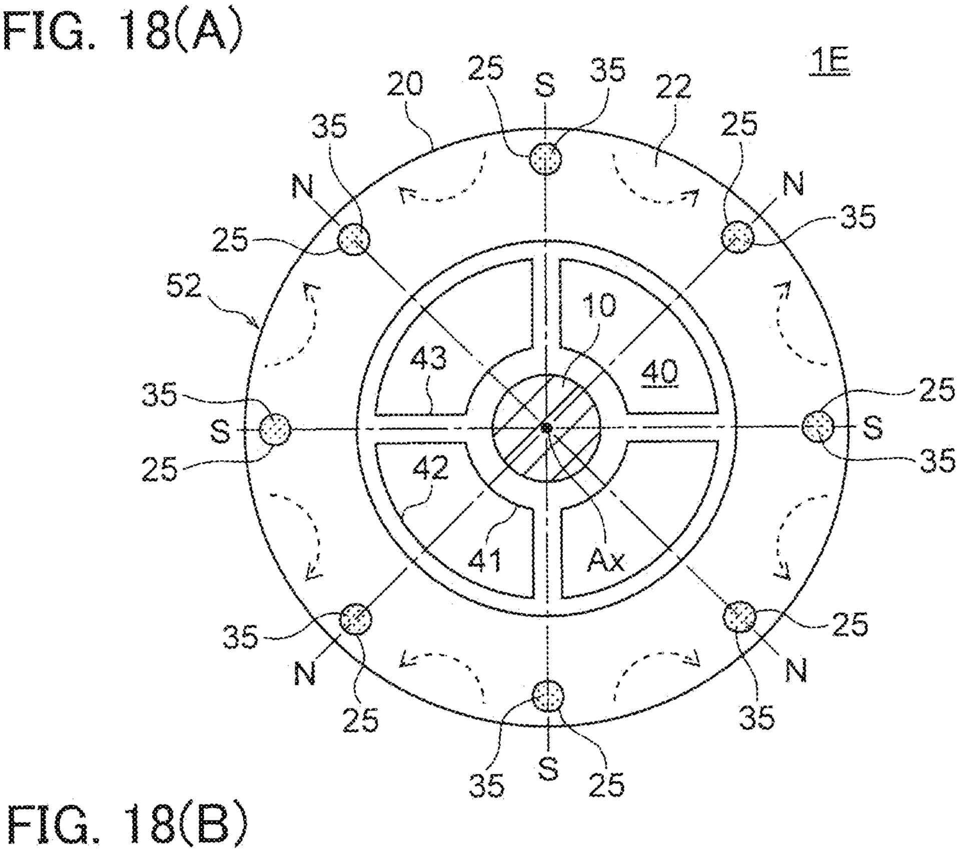
FIG. 18(A) is a sectional view taken along line 18A-18A shown in FIG. 17(A).
Figure 18B:
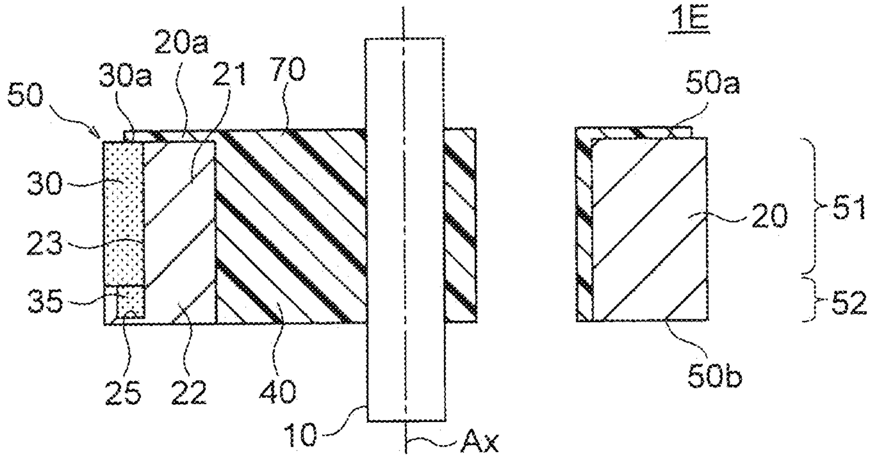
FIG. 18(B) is a sectional view taken along line 18B-18B shown in FIG. 17(B).

FIG. 18(A) is a sectional view taken along line 16A-16A shown in FIG. 17(A), that is, a sectional view of the rotor 1E in a plane passing through the overhang portion 52. FIG. 18(B) is a sectional view taken along line 18B-18B shown in FIG. 17(B).

As illustrated in FIG. 18(A), the second portion 22 of the ferrite bonded magnet 20 includes the recesses 25 described in the third embodiment, and the recesses 25 house the projections 35 of the rare-earth bonded magnets 30.

As illustrated in FIG. 18(B), the cover member 70 is preferably integrally formed with the resin portion 40. In this case, the resin portion 40 and the cover member 70 can be integrally molded by placing the shaft 10 and the rotor magnet 50 in the third mold and filling the third mold with a thermoplastic resin such as PBT in step ST12 in FIG. 7. Accordingly, the manufacturing process of the rotor 1E can be simplified.

In this case, a natural frequency and an inertia of the rotor 1E can be adjusted by adjusting dimensions and the like of ribs 43 of the resin portion 40.

The natural frequency of the rotor 1E depends on rigidity of the rotor 1E, and thus the natural frequency can be adjusted by changing the radial length of the ribs 43, the circumferential width of the ribs 43, or the number of the ribs 43. The adjustment of the natural frequency of the rotor 1E can reduce vibrations caused by resonance.

The inertia of the rotor 1E depends on the mass of the rotor 1E, and thus the inertia of the rotor 1E can be adjusted by changing the radial length of the ribs 43, the circumferential width of the ribs 43, or the number of the ribs 43. When the inertia of the rotor 1E is increased, a torque necessary for start increases, but rotation of the rotation 1E can be stabilized.

In this embodiment, the cover member 70 is provided at the first end surface 50*a* of the rotor magnet 50, but the cover member 70 may be provided at each of the first end surface 50*a* and the second end surface 50*b*. In this case, integrity of the rotor 1E can be further enhanced.

Alternatively, the end surface 20*a* of the ferrite bonded magnet 20 and the end surfaces 30*a* of the rare-earth bonded magnets 30 may be provided with convexes and concaves, and the cover members 70 may be provided to cover the convexes and concaves.

Except for the aspects described above, the rotor 1E of the sixth embodiment is configured in a similar manner to the rotor 1 of the first embodiment.

As described above, the rotor 1E of the sixth embodiment includes the cover member 70 covering at least a portion of each of the ferrite bonded magnet 20 and at least a portion of each rare-earth bonded magnet 30 at the first end surface 50*a* of the rotor magnet 50. Thus, the rare-earth bonded magnets 30 can be firmly fixed to the ferrite bonded magnet 20. Accordingly, detachment of the rare-earth bonded magnets 30 from the ferrite bonded magnet 20 can be prevented against a temperature change or a centrifugal force.

Further, in a case where the cover member 70 is made of the same material as the resin portion 40 and integrally molded with the resin portion 40, the resin portion 40 and the cover member 70 can be integrally molded by placing the shaft 10 and the rotor magnet 50 in the mold and filling the mold with a resin. Accordingly, the manufacturing process of the rotor 1E can be simplified.

The sixth embodiment may be combined with features described in the second embodiment, the third embodiment, the modification, the fourth embodiment, or the fifth embodiment.

Seventh Embodiment

Figure 19:
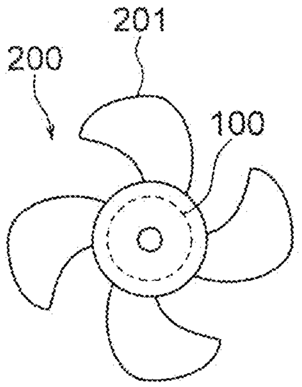
FIG. 19 is a view illustrating a blower according to a seventh embodiment.

Next, a configuration of a blower 200 according to a seventh embodiment will be described. FIG. 19 is a diagram schematically illustrating a configuration of the blower 200 according to the seventh embodiment.

As illustrated in FIG. 19, the blower 200 includes the motor 100 and a fan 201 serving as an impeller driven by the motor 100. The fan 201 is attached to a shaft 10 (FIG. 1) of the motor 100. When the shaft 10 of the motor 100 rotates, the fan 201 rotates, and an airflow is generated. The blower 200 is used as an outdoor blower of an outdoor unit 320 of an air conditioner 300 (FIG. 20) described later. In this case, the fan 201 is, for example, a propeller fan.

The blower 200 according to the seventh embodiment includes the motor 100 described in the first embodiment, and thus the manufacturing cost can be reduced while suppressing decrease in output and efficiency of the blower 200. In the case of using the motor described in any one of the second through sixth embodiments instead of the motor 100 described in the first embodiment, similar advantages can be obtained.

Eighth Embodiment

Figure 20:
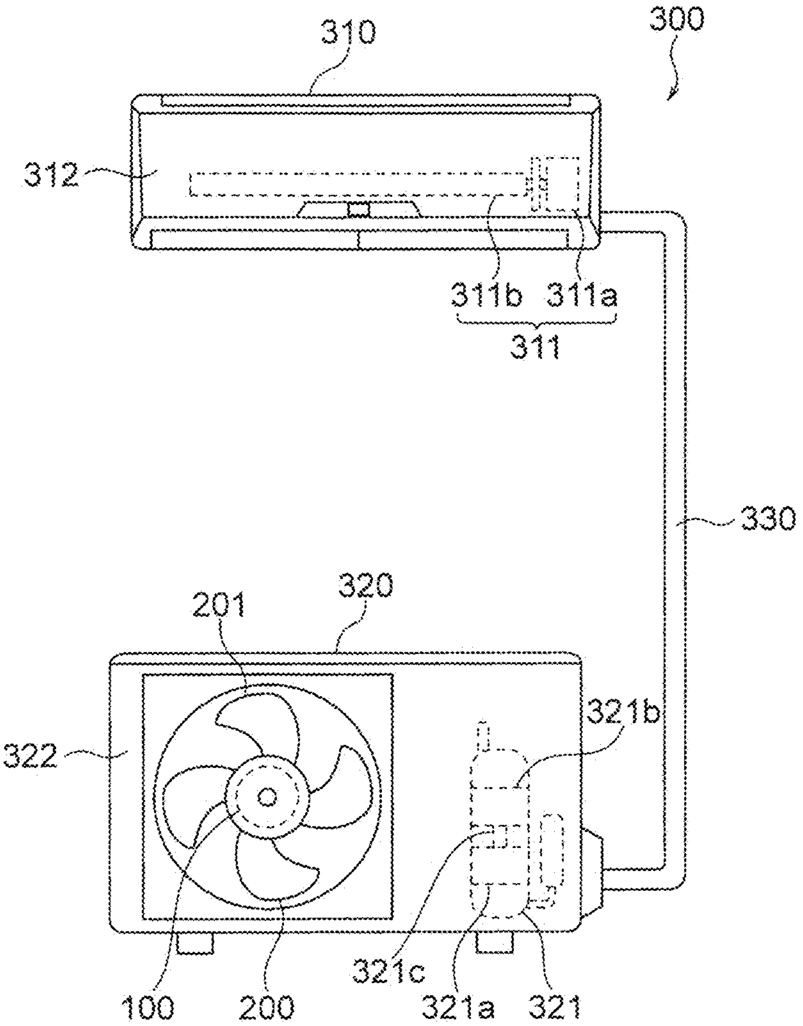
FIG. 20 is a view illustrating an air conditioner according to an eighth embodiment.

Next, a configuration of an air conditioner 300 including the blower 200 according to an eighth embodiment will be described. FIG. 20 is a view illustrating a configuration of the air conditioner 300 according to the eighth embodiment.

As illustrated in FIG. 20, the air conditioner 300 includes an indoor unit 310 and an outdoor unit 320. The indoor unit 310 and the outdoor unit 320 are connected to each other by a refrigerant pipe 330 and constitute a refrigerant circuit in which refrigerant circulates. The air conditioner 300 is capable of performing operations such as a cooling operation of sending cold air and a heating operation of sending warm air from the indoor unit 310, for example.

The indoor unit 310 includes an indoor blower 311 and a housing 312 housing the indoor blower 311. The indoor blower 311 includes a motor 311*a* and a fan 311*b* that is driven by the motor 311*a*. The fan 311*b* is attached to a shaft of the motor 311*a*. When the shaft of the motor 311*a* rotates, the fan 311*b* rotates, and an airflow is generated. The fan 311*b* is, for example, a crossflow fan.

The outdoor unit 320 includes a blower 200 as an outdoor blower, a compressor 321, and a housing 322 housing the blower 200 and the compressor 321. The compressor 321 includes a compressor mechanism 321*a* that compresses a refrigerant, and a motor 321*b* that drives the compressor mechanism 321*a*. The compressor mechanism 321*a* and the motor 321*b* are coupled to each other by a shaft 321*c*. The motor 100 according to the first embodiment may be used as the motor 321*b* of the compressor 321.

For example, in a cooling operation of the air conditioner 300, heat is released when the refrigerant compressed by the compressor 321 is condensed by a condenser (not shown), and the heat is released to the outside with air sent from the blower 200. The outdoor unit 320 further includes a four-way valve (not shown) that switches a flow direction of refrigerant. The four-way valve of the outdoor unit 320 causes a high-temperature and high-pressure gas sent from the compressor 321 to flow to a heat exchanger of the outdoor unit 320 in a cooling operation and to flow to a heat exchanger of the indoor unit 310 in a heating operation.

The blower 200 is not limited to the outdoor blower of the outdoor unit 320, and may be used as the indoor blower 311 described above. The blower 200 is not limited to the air conditioner 300, and may be included in other electric equipment.

The air conditioner 300 according to the eighth embodiment includes the blower 200 described in the seventh embodiment, and thus the manufacturing cost can be reduced while suppressing decrease in output and efficiency of the air conditioner 300.

Although the preferred embodiments have been specifically described above, the present disclosure is not limited to these embodiments, and various improvements and modifications may be made.

What is claimed is:

1. A motor comprising:

a rotor having a shaft and a rotor magnet fixed with respect to the shaft; and a stator surrounding the rotor in a radial direction about the shaft, wherein the rotor magnet comprises:

a first magnet magnetized so as to have polar-anisotropic orientation, and second magnets, the number of which is P (P is an even number), provided on an outer circumference of the first magnet, magnetized so as to have polar-anisotropic orientation, and having a stronger magnetic pole than the first magnet, wherein the stator has a stator core and a coil wound on the stator core, wherein a length Hr of the rotor magnet in an axial direction of the shaft and a length Hs of the stator core in the axial direction satisfy Hr>Hs, wherein the rotor magnet has, in the axial direction, a stator-facing portion facing the stator core in the radial direction and an overhang portion protruding from the stator core in the axial direction, wherein the first magnet has grooves, the number of which is P, arranged at equal intervals on the outer circumference at the stator-facing portion, wherein the second magnets are respectively disposed in the grooves, and wherein a volume ratio of the second magnets to the first magnet is smaller in the overhang portion than in the stator-facing portion, wherein a distance R1 from a center axis of the shaft to an outer circumference of the stator-facing portion and a distance R2 from the center axis to an outer circumference of the overhang portion satisfy R1>R2.

2. The motor according to claim 1, wherein the overhang portion has the first magnet and does not have the second magnets.

3. A motor comprising:

a rotor having a shaft and a rotor magnet fixed with respect to the shaft; and a stator surrounding the rotor in a radial direction about the shaft, wherein the rotor magnet comprises:

a first magnet magnetized so as to have polar-anisotropic orientation, and second magnets, the number of which is P (P is an even number), provided on an outer circumference of the first magnet, magnetized so as to have polar-anisotropic orientation, and having a stronger magnetic pole than the first magnet, wherein the stator has a stator core and a coil wound on the stator core, wherein a length Hr of the rotor magnet in an axial direction of the shaft and a length Hs of the stator core in the axial direction satisfy Hr>Hs, wherein the rotor magnet has, in the axial direction, a stator-facing portion facing the stator core in the radial direction and an overhang portion protruding from the stator core in the axial direction, wherein the first magnet has grooves, the number of which is P, arranged at equal intervals on the outer circumference at the stator-facing portion, wherein the second magnets are respectively disposed in the grooves, wherein a volume ratio of the second magnets to the first magnet is smaller in the overhang portion than in the stator-facing portion, wherein each of the second magnets has an outer circumferential surface facing outward in the radial direction and an inner circumferential surface facing inward in the radial direction, and wherein in a plane orthogonal to the axial direction, a length of the inner circumferential surface is longer than a length of the outer circumferential surface.

4. The motor according to claim 1, wherein the first magnet has recesses in portions in contact with the second magnets, and wherein the second magnets have projections housed in the recesses of the first magnet.

5. The motor according to claim 1, wherein the first magnet has projections in portions in contact with the second magnets, and wherein the second magnets have recesses each surrounding a corresponding one of the projections of the first magnet.

6. The motor according to claim 1, wherein the second magnets have protrusions that extend inward in the radial direction along an end surface of the rotor magnet opposite to the overhang portion, and wherein the first magnet has receiving portions that receive the protrusions of the second magnets.

7. A motor comprising:

a rotor having a shaft and a rotor magnet fixed with respect to the shaft;

a stator surrounding the rotor in a radial direction about the shaft, wherein the rotor magnet comprises:

a first magnet magnetized so as to have polar-anisotropic orientation, and second magnets, the number of which is P (P is an even number), provided on an outer circumference of the first magnet, magnetized so as to have polar-anisotropic orientation, and having a stronger magnetic pole than the first magnet, wherein the stator has a stator core and a coil wound on the stator core, wherein a length Hr of the rotor magnet in an axial direction of the shaft and a length Hs of the stator core in the axial direction satisfy Hr>Hs, wherein the rotor magnet has, in the axial direction, a stator-facing portion facing the stator core in the radial direction and an overhang portion protruding from the stator core in the axial direction, wherein the first magnet has grooves, the number of which is P, arranged at equal intervals on the outer circumference at the stator-facing portion, wherein the second magnets are respectively disposed in the grooves, wherein a volume ratio of the second magnets to the first magnet is smaller in the overhang portion than in the stator-facing portion, and wherein a cover member is located at an end surface of the rotor magnet on a side opposite to the overhang portion, the cover member covering at least a portion of the first magnet and at least a portion of each of the second magnets.

8. The motor according to claim 7, further comprising:

a holding portion coupling the rotor magnet and the shaft to each other, wherein the cover member is made of material which is same as that of the holding portion, and integrally formed with the holding portion.

9. The motor according to claim 1, wherein the first magnet is a ferrite bonded magnet, and wherein the second magnets are rare-earth bonded magnets.

10. A blower comprising:

the motor according to claim 1; and an impeller driven by the motor.

11. An air conditioner comprising:

an indoor unit; and an outdoor unit connected to the indoor unit, wherein at least one of the indoor unit and the outdoor unit comprises the blower according to claim 10.

* * * * *